US012748992B1

(12) United States Patent
Cui et al.

(10) Patent No.: US 12,748,992 B1
(45) Date of Patent: Sep. 29, 2026

(54) HIERARCHICAL HIDDEN MARKOV MODEL-BASED RECOMMENDATION SYSTEM AND METHOD WITH COMBINED TAXONOMY AND INTENT STATE REPRESENTATION

(71) Applicant: Intuit Inc., Mountain View, CA (US)

(72) Inventors: Wendi Cui, Jersey City, NJ (US); Jiaxin Zhang, Mountain View, CA (US); Damien J. Lopez, San Diego, CA (US); Joel D. Atwood, San Diego, CA (US); Palak Samel, San Diego, CA (US); Amit Agarwal, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/285,692

(22) Filed: Jul. 30, 2025

(51) Int. Cl.
*G06N 7/01* (2023.01)
*G06F 18/2415* (2023.01)
*G06N 3/04* (2023.01)

(52) U.S. Cl.
CPC .......... *G06N 7/01* (2023.01); *G06F 18/2415* (2023.01); *G06N 3/04* (2013.01)

(58) Field of Classification Search
None
See application file for complete search history.

(56) References Cited

U.S. PATENT DOCUMENTS

2017/0213274 A1* 7/2017 Vijayaraghavan .......................... G06Q 30/0631

OTHER PUBLICATIONS

Aghdam, Context-aware recommender systems using hierarchical hidden Markov model, Physica A 518 (2019); pp. 89-98 (Year: 2019).*

Sun et al., Conversational Recommender System, arXiv:1806.03277v1 [cs.IR]; Jun. 8, 2018; Total pp. 10 (Year: 2018).*

Aghdam et al., Adapting Recommendations to Contextual Changes Using Hierarchical Hidden Markov Models, RecSys '15: Proceedings of the 9th ACM Conference on Recommender Systems (Sep. 2015); Total pp. 5 (Year: 2015).*

Kwok, "Baum-Welch algorithm for training a Hidden Markov Model—Part 2 of the HMM series," Analytics Vidhya, Jul. 2019, 6 pages.

* cited by examiner

*Primary Examiner* — Alan Chen
(74) *Attorney, Agent, or Firm* — Dinsmore & Shohl LLP

(57) ABSTRACT

Certain aspects of the disclosure provide methods, systems, and apparatuses for providing taxonomy-boosted hierarchical hidden Markov modeling to enhance recommendation inferences and machine learning model training. A hierarchical structure of enterprise knowledge is constructed to provide searching knowledge in a desired granularity. A hidden state space may be defined for a hierarchical hidden Markov model, where each hidden state in the hidden state space is associated with a node in the hierarchical structure and an intent category obtained from observing the actions, events, and behavior of the user. Training a classification model may be provided to predict a probability of each hidden state in the hidden state space based on a user input. Training the hierarchical hidden Markov model may be provided based on a training data set labeled for each hidden state in a hidden state space.

18 Claims, 10 Drawing Sheets

500

HIDDEN STATE SPACE

| | Topic (e.g., Domain or Sub-Domain) 501 | Intent 502 |
|---|---|---|
| 504 | HR à Recruitment | Action Performing |
| 506 | HR | Small Talk |
| 508 | IT à Hardware | Information Seeking |
| 510 | IT à Hardware | Action Performing |
| 512 | IT à Software à Project Management | Small Talk |
| | ... | ... |

*FIG. 5*

HIERARCHICAL HIDDEN MARKOV MODEL-BASED RECOMMENDATION SYSTEM AND METHOD WITH COMBINED TAXONOMY AND INTENT STATE REPRESENTATION

BACKGROUND

Field

Aspects of the present disclosure relate to user application services.

Description of Related Art

User application services, such as question-answer plugins, are software components designed to facilitate interactive communication between users and enterprise systems. A question-answer plugin typically functions as an automated assistant or chatbot, enabling users to submit queries in natural language and receive relevant responses or actions in return. When a user enters a question or request—such as "How do I reset my password?" or "What is the company's holiday policy?"—the plugin processes the input and retrieves or generates an appropriate answer from available information sources. In some implementations, the question-answer plugin may also perform actions on behalf of the user, such as submitting forms, initiating workflows, or providing links to relevant resources. By integrating with various backend systems and knowledge bases, the question-answer plugin streamlines information retrieval and task completion, enhancing user productivity and delivering a more intuitive, interactional experience.

SUMMARY

According to one aspect, a method includes receiving a user input associated with a user and processing the user input with a trained classification model to generate a predicted hidden state. Further, the method may include the predicted hidden state being associated with a trained hierarchical hidden Markov model, and the predicted hidden state being associated with a node in a taxonomy and an intent category. The method includes determining a most probable next hidden state using the trained hierarchical hidden Markov model and based on the predicted hidden state. The method includes generating a recommendation based on the most probable next hidden state and providing the recommendation to the user.

In another aspect, a method includes constructing a hierarchical taxonomy representing enterprise knowledge, the hierarchical taxonomy comprising a plurality of nodes each corresponding to a domain, a sub-domain, or a category. Further, the method includes categorizing user intents into a plurality of intent categories. The method includes defining a hidden state space for a hierarchical hidden Markov model, wherein each hidden state in the hidden space is associated with a node in the hierarchical taxonomy and an intent category of the plurality of intent categories. The method includes determining transition probabilities for transitions between hidden states in the hidden state space. The method includes determining emission probabilities associating user inputs with hidden states in the hidden state space. The method includes training a classification model to predict a probability of each hidden state in the hidden state space based on a user input and training the hierarchical hidden Markov model based on a set of training user inputs each labeled with a hidden state.

The following description and the related drawings detail certain illustrative features of one or more aspects of this disclosure.

DESCRIPTION OF THE DRAWINGS

The appended figures depict certain aspects and are therefore not to be considered limiting of the scope of this disclosure.

FIG. 5 depicts an example of a data structure that is used to represent a hidden state space.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
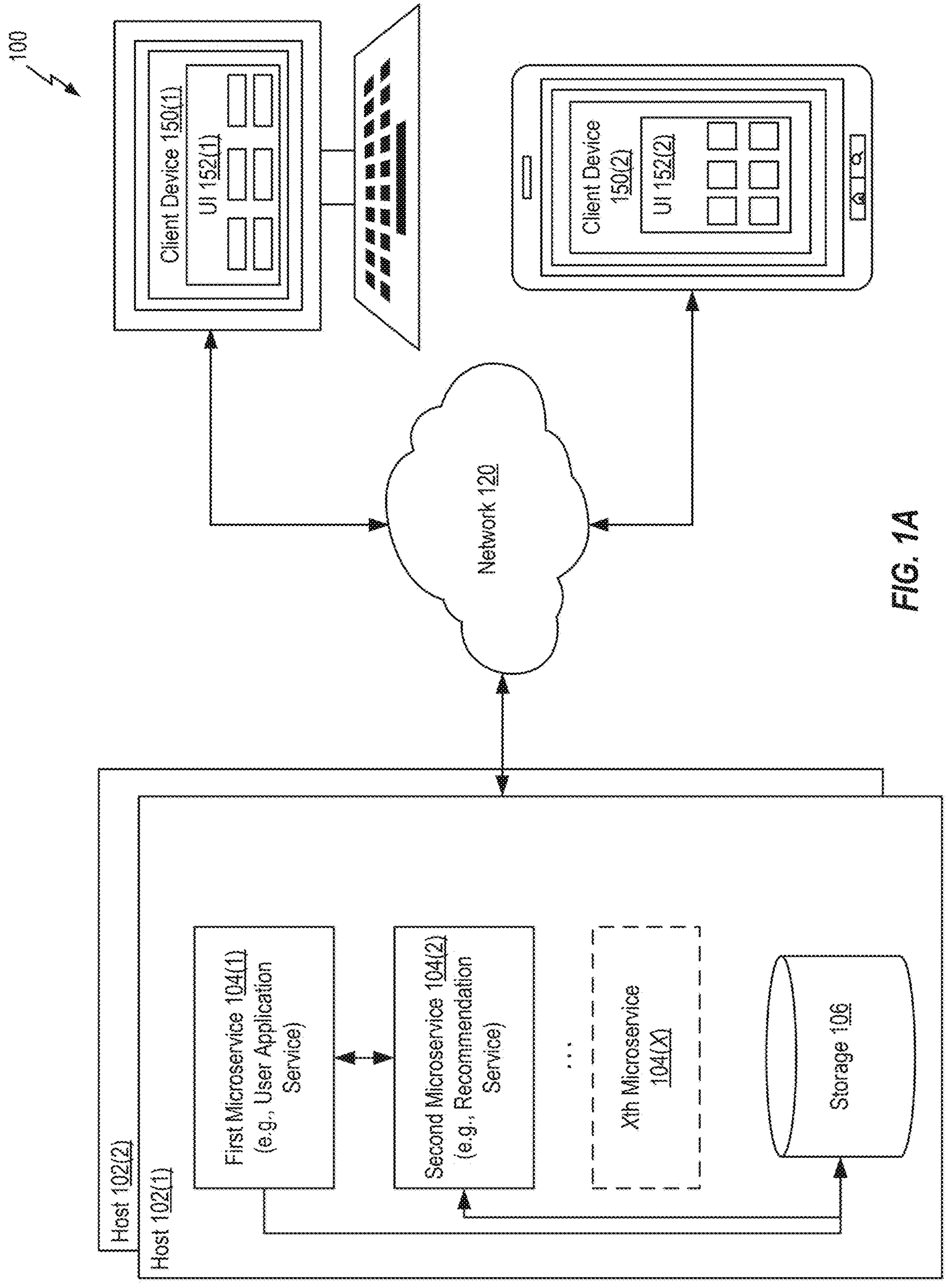
FIG. 1A depicts a computing environment implementing a plurality of microservices.

User application services, such as question-answer plugins, may be configured to employ a recommendation service, which provides recommendations to a user based on user interactions with the question-answer plugin. In some aspects, recommendation services may be based on a hidden Markov model (HMM) to analyze user interactions and determine the underlying intent and meaning of user queries submitted via the question-answer plugin. A conventional HMM is a statistical model used to represent systems that are assumed to follow a Markov process with unobservable, or "hidden," states. In some aspects, the hidden states represent the intent behind the explicit words of the user queries. In a standard HMM, the system is modeled as a sequence of discrete time steps, where at each step the system occupies one of a finite set of hidden states. The HMM is defined by three main components: initial state probabilities, transition probabilities, and emission probabilities.

The initial state probabilities specify the likelihood of the system starting in each possible hidden state. Transition probabilities define the likelihood of moving from one hidden state to another at each time step, capturing the sequential dependencies between states. Emission probabilities describe the likelihood of observing a particular output or observation given that the system is in a specific hidden state. In a conventional HMM, each hidden state is typically associated with a single label, and the observations are assumed to be generated solely based on the current hidden state, independent of previous observations or states.

Training a conventional HMM involves estimating the model parameters-initial, transition, and emission probabilities-using algorithms such as the Baum-Welch expectation-maximization algorithm, based on sequences of observed data. Once trained, the HMM can be used to infer the most likely sequence of hidden states that could have generated a given sequence of observations, often using the Viterbi algorithm. The Viterbi algorithm determines the most likely sequence of hidden states by recursively computing, for each time step and each possible hidden state, the highest probability of any path that ends in that state, given the observed sequence up to that point. At each step, it keeps track of both the maximum probability and the corresponding previous state, allowing it to efficiently backtrack at the end of the sequence to reconstruct the overall most probable path through the hidden states.

Conventional HMMs have several shortcomings, particularly when applied to complex, real-world scenarios, such as multi-domain dialogue systems or enterprise knowledge management. One major limitation is that each hidden state in a conventional HMM is typically associated with a single label, which fails to capture the multi-dimensional nature of user interactions where both the topic and the user's intent are important for understanding context. As a result, conventional HMMs struggle to model situations where users shift between different topics or intents within the same interaction, leading to less accurate predictions and less relevant recommendations.

Additionally, conventional HMMs assume that observations are generated solely based on the current hidden state, without considering the hierarchical relationships or dependencies that may exist between different domains or sub-domains in enterprise knowledge. This flat structure makes it difficult to represent and leverage the granularity and organization of complex knowledge bases. Furthermore, conventional HMMs typically rely on exact matches between observations and hidden states, which limits their ability to handle the diversity and nuance of natural language, especially when user inputs vary in phrasing or expression. These shortcomings make existing HMMs less effective in dynamic, multi-intent, and multi-domain environments where a more sophisticated and context-aware modeling approach is beneficial.

Accordingly, aspects of the present disclosure provide apparatuses, methods, processing systems, and computer-readable mediums for taxonomy-boosted hierarchical hidden Markov modeling that overcome the technical problems associated with existing hidden Markov models.

For example, the taxonomy-boosted hierarchical hidden Markov model (HHMM) described herein provides a framework for modeling user interactions in user applications by combining hierarchical domain knowledge with user intent categorization. At a high level, this approach leverages a structured taxonomy of enterprise knowledge-such as departments, sub-domains, and specific topics-together with distinct intent categories like information seeking, action performing, and small talk. By integrating both the topic and the user's intent into the hidden state space, the model enables a more nuanced and context-aware understanding of user behavior as compared to existing HMMs. This allows the recommendation service to generate more relevant and personalized recommendations throughout a user interaction.

A user interaction refers to any form of communication or engagement between a user and the user application, such as the question-answer plugin. In some aspects, user interactions occur during real-time conversations, such as voice or text-based chat, as well as asynchronous communications, including emails, messages, or notifications. User interactions may also include actions such as submitting forms, clicking interface elements, navigating through application menus, or any other observable behavior that provides input to the system for processing and response.

Aspects of the taxonomy-boosted HHMM herein operate by collecting and labeling historical user messages with their corresponding taxonomy nodes and intent categories. For each hidden state, which represents a unique combination of a taxonomy node and an intent of the user, the recommendation service estimates how likely it is for a particular type of message to occur. A machine learning classifier, such as a text classification model, is trained to predict the likelihood of each hidden state for a given user input. Additionally, embedding-based similarity measures, such as sentence embeddings and cosine similarity, are used to assess how closely a new user input matches previously labeled examples for each hidden state. This process results in a distribution of messages for each hidden state, enabling the model to accurately map diverse user inputs to the appropriate context within the enterprise taxonomy.

Further, aspects of the taxonomy-boosted HHMM directly address and overcome the technical limitations of conventional hidden Markov models. Unlike traditional HMMs, which associate each hidden state with a single label and lack the ability to represent multi-dimensional user behavior, the taxonomy-boosted HHMM described herein uses hidden states as combinations of both taxonomy domains and intent categories. This allows the system to capture complex user transitions, such as shifting between different topics or changing intents within the same interaction. The hierarchical structure constrains transitions to more likely and contextually relevant paths, improving the accuracy of intent and topic inference. As a result, the system delivers more precise and contextually appropriate recommendations, even in dynamic, multi-domain, and multi-intent dialogue scenarios, which provides better alignment with user needs and the structure of enterprise knowledge.

Example Computing Environment Implementing a Recommendation Service

FIG. 1A depicts an example system 100 supporting a plurality of the microservices (e.g., software-defined services, which in some cases, may be cloud-native). As shown in FIG. 1A, system 100 includes client devices 150(1)-(2) (collectively referred to herein as "client devices 150") and hosts 102(1)-(2) (collectively referred to herein as "hosts 102") interconnected through a network 120.

Network 120 may be, for example, a direct link, a local area network (LAN), a wide area network (WAN), such as the Internet, another type of network, or a combination of one or more of these networks. Network 120 may provide the hosts 102 with access to external networks and thereby to external processing systems. Network 120 may generally be any hardware and/or software capable of transmitting and/or receiving data via a wired or wireless network connection. Accordingly, network 120 may include a communication transceiver for sending and/or receiving any wired and/or wireless communication.

Examples of client devices 150 may include a smartphone, a personal computer, a tablet, a laptop computer, and/or other devices. Client device 150(1) and client device 150(2) may each include a user interface (UI) which may be used to observe user activity (e.g., uttered phrases/keywords, user click or navigation, full or partial user sentences, etc.) Client devices 150 may include any device, mechanism, system, interactive display, and/or various other hardware and software components for communicating information between the hosts 102 and the client devices 150. For example, client devices 150 may include input hardware (e.g., keyboard, touch screen, button, microphone, speaker, and/or other device for receiving input from the user and sending outputs to the user).

The client devices 150 may generally include any sort of device configured to display, data, information, graphics, user interface elements, and the like to a user. For example, client devices 150 may include internal and external displays such as an internal display of a tablet computer or an external display for a server computer or a projector. Client devices 150 may further include displays for devices, such as augmented, virtual, and/or extended reality devices. In various aspects, client devices 150 may be configured to display graphical user interface. In another aspect, client devices 150 may generally be an electronic device configured to execute computer-executable instructions, such as those derived from compiled computer code, including without limitation personal computers, tablets, servers, smart phones, smart devices, wearable devices, augmented and/or virtual devices, and others.

Hosts 102 may be geographically co-located servers on the same rack or on different racks in any arbitrary location in a data center. Hosts 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1A).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another of the microservices 104, through the X-th microservice 104(X) using the network 120. In some aspects, communication between client devices 150 and at least one of the microservices 104 may be facilitated by one or more application programming interfaces (APIs).

As shown in FIG. 1A, in certain aspects, the first microservice 104(1) implements a user-application service, such as a question-answer plugin. A question-answer plugin is a type of user interface that is configured for submitting and answering user queries. Question-answer plugins may also be referred to as automated assistants or chatbots, which are configured to simulate interactions with human users and provide answers or perform tasks based on user queries. In certain aspects, the second microservice 104(2) implements a recommendation service according to the aspects described herein. In some aspects, the recommendation service is configured for providing recommendations using a HHMM that integrates taxonomy domains and intent categories to allow for a deeper understanding of a user's context throughout an interaction, such as an interaction facilitated by a question-answer plugin.

Though FIG. 1A depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1A depicts only two of the hosts 102 and two of the client devices 150, other examples may include more or fewer of the hosts 102 and/or client devices 150, and client devices 150 may use any combination of microservices 104 on any of hosts 102 where microservices 104 are deployed.

Recommendation Service

Figure 1B:
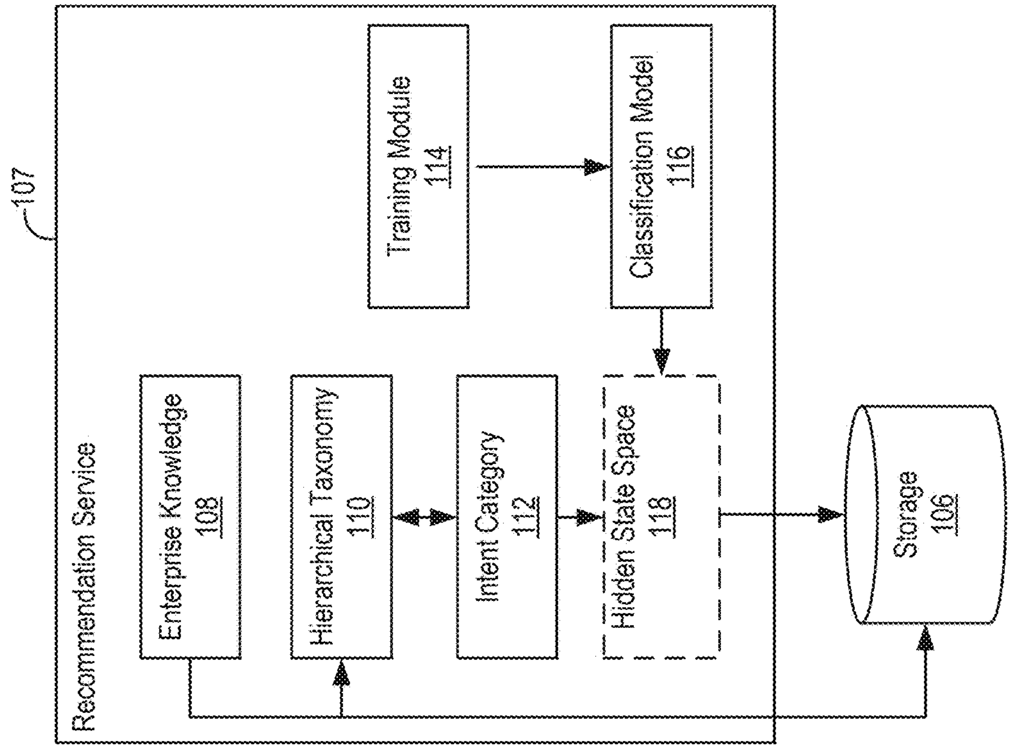
FIG. 1B depicts an example process associated with a recommendation service.

FIG. 1B depicts a recommendation service 107, such as microservice 104(2) of FIG. 1A. In some aspects, the recommendation service is configured to generate, manage, and display enterprise knowledge 108 regarding an enterprise. Enterprise knowledge refers to the collective information, data, and organizational content relevant to an enterprise, including but not limited to entities such as personnel, departments, projects, policies, procedures, documents, records, and other resources that are used to support business operations and decision-making. In the context of the recommendation service, enterprise knowledge may be structured in a hierarchical taxonomy and may encompass both structured and unstructured data sources, enabling efficient retrieval, management, and utilization of information across the organization. The application may include enterprise knowledge 108 that allows client devices 150 or an application executing on client devices 150 to access specific information of the enterprise knowledge 108. While aspects described herein reference the use of enterprise knowledge, the taxonomy-boosted HHHM described herein may be used with any knowledge base.

The recommendation service 107 may be configured to generate and update entity records to be stored in the enterprise knowledge 108. In an aspect, the recommendation service 107 may include a component to aggregate and name information from enterprise source documents and input observed from client devices 150 to generate entity records for entity names and other entity data (e.g., metadata mined from source documents). Entity metadata that may be included in the enterprise knowledge 108 may be personnel relations, record relations, and dates.

In some aspects, enterprise knowledge 108 may be generated based on a dialogue system, but may be used in other systems (e.g., mailboxes, file management systems, etc.) to process individual user inquiries and/or requests. The client devices 150 retrieve information from the recommendation service 107 in the form of a recommendation via a display that corresponds to the enterprise knowledge 108. A topic may refer to a specific entity or subject within the enterprise knowledge 108 that contains information the user has requested to access or view as part of a recommendation. For example, a dialogue may be configured to highlight or link words in a query or request to entities in enterprise knowledge 108. A user may receive a recommendation from a topic within the enterprise knowledge 108, for example, based on the highlighted or linked word.

In an aspect, the enterprise knowledge 108 may be configured in taxonomy categorized knowledge domains and a semantic ontology assigned thereto providing highly relevant search and match features along with an enhanced level of precision in the process of knowledge invocation. A semantic ontology is a structured framework that defines the relationships and meanings of concepts within a particular domain, enabling more accurate interpretation and organization of information. Knowledge invocation refers to the process of retrieving and utilizing relevant information from an enterprise knowledge base in response to a user's query or action.

The recommendation service 107 may be configured to construct a hierarchical taxonomy 110 representing the enterprise knowledge 108 whereby the hierarchical taxonomy 110 includes a plurality of nodes. Each node corresponds to a domain, a sub-domain, or a category. Each of the topic nodes of the enterprise knowledge 108 may provide searching knowledge in the desired granularity. The hierarchical taxonomy 110 of enterprise knowledge 108 provides for multiple filters and openers and multiple combinations thereof whereby determining the search criterion to limit search to any selected tier of enterprise knowledge 108. An example of a hierarchical taxonomy is described in further detail with respect to FIG. 4A.

In another aspect, each of the inquiries or requests conducted by the user via the client devices 150 may be recorded by the recommendation service 107, which forms a ready-made knowledge package for the hierarchical taxonomy 110 of enterprise knowledge 108 defined in terms of a keyword in specific context therewith. Multiple entities may be in the particular taxonomically identified knowledge domain specifying search entities wherein the recommendation service 107 optimizes the information and knowledge with the use of the hierarchical taxonomy 110 substantially saving time and efforts thereof along with providing highly relevant information and knowledge contents validated in the closest context in the relevant domain.

In some aspects, the recommendation service 107 may capture the intent category 112 by observing the user's actions, events, and behaviors. The recommendation service 107 analyzes these observations to determine which keywords are most relevant to the user's intent. The recommendation service 107 then associates the user's experience and efforts with specific topics, allowing users to develop multiple topics using various keywords within a particular taxonomical category. This approach improves both the relevance of information and the overall user experience within a specific knowledge domain. In another aspect, the recommendation service 107 may be configured to categorize user intents into one or more intent categories, such as intent category 112. Storage 106 may be configured to store data structures, keyword taxonomy information, advertisement information, user click and impression information, and/or other non-program information to determine an intent category (e.g., information seeking, action performing, or small talk). The intent category 112 may be obtained by observing an input device associated with the client devices 150. The input device may be of any suitable type for receiving user input, including for example a keyboard, touch screen, microphone (e.g., for voice input,) mouse, touch pad, and the like.

The recommendation service 107 may be configured to process a statement of intent in a natural language, not just keywords. The recommendation service 107 may be configured to infer semantic intent from a language input operationalizing semantic intent into a strategy for using online services and executing that strategy on behalf of the user. In one aspect, the recommendation service 107 may be configured to parse the text input and generate a list of possible interpretations of the user's intent.

In an aspect, the recommendation service 107 may be configured to combine the hierarchical taxonomy 110 and the intent category 112 to construct a hidden state space 118. The hidden state space 118 may be defined for a HHMM whereby each hidden state in the hidden state space 118 is associated with a node in the hierarchical taxonomy 110 and an intent category 112. The hidden state space 118 may be used for acquiring depth distribution corresponding to the user's target words, wherein the target words belong to any topic in the enterprise knowledge 108. Depth distribution refers to the allocation or mapping of user target words across different levels of the hierarchical taxonomy within the hidden state space, indicating how user inputs are associated with varying degrees of specificity or granularity in the enterprise knowledge 108.

The recommendation service 107 may be configured to determine a probability of transitioning from a first hidden state to a subsequent hidden state in a hidden state space 118. The user's input in the client device 150 may be relevant to a first hidden state in association with a domain, subdomain, or category in the hierarchical taxonomy 110. An algorithm (e.g., Viterbi, forward-backward, etc.) may be employed to determine the most likely subsequent hidden state to aid in the recommendation output to the user. In another aspect, the user's input in the client device 150 may be relevant to a first hidden state in association with an intent category 112. The algorithm may be employed to determine the most likely subsequent hidden state to aid in the recommendation output to the user.

In another aspect, the recommendation service 107 may be configured to provide emissions probabilities associating user input with hidden states in the hidden state space 118. An emission probability may be generated for every hidden state in the hidden state space 118 that may be considered for each recommendation. Each hidden state of the hidden state space 118 has an associated emission probability for recommending an output to the client devices 150 corresponding to the enterprise knowledge 108.

The recommendation service 107 may employ a training module 114 to train a classification model 116 to predict a probability of each hidden state in the hidden state space 118 based on a user's input from client devices 150. Based on the enterprise knowledge 108 and question and answer context, the recommendation service 107 accurately identifies the domain and intent according to content of the user's query. The training module 114 may train the classification model 116 to predict the probability of each hidden state in the hidden state space 118 based on the user input of the client devices 150. In one example, the trained classification model may be a multilayer perceptron model or other neural network to provide adjustments through a training process to effectively map user inputs to a recommendation by the recommendation service 107.

The training module 114 may provide a training data set of training observations associated with a respective hidden state of the hidden state space 118. The recommendation service 107 may be configured to count the number of training observations in the training data whereby emission probabilities associated with user inputs to the client devices 150 are relevant to hidden states in the hidden state space 118. In an aspect, the recommendation service 107 may determine emission probabilities by associating user inputs with hidden states in the hidden state space 118. For each respective hidden state in the hidden state space 118, the recommendation service 107 may be configured to determine a probability of the respective hidden state for each training user input whereby a summation of probabilities may be provided for each hidden state of the hidden state space 118 for all training user inputs. The recommendation service 107 may be configured to determine an emission probability for a hidden state based on the summed probabilities and a number of training user inputs.

In one aspect, the HHMM associated with the hidden state space 118 may be configured to perform an expectation maximization algorithm to model the correlation of each hidden state of the hidden state space 118 relevant to the user's input on the client devices 150 by determining the expectation of the user and maximizing the expectation to aid in the recommendation output to the user via the client devices 150. In another aspect, the expectation maximization algorithm may be a Baum-Welch algorithm for training the HHMM associated with the hidden state space 118. The Baum-Welch algorithm may be used to iteratively refine estimates of the transition probabilities between hidden states and the likelihood of a user input via the client devices 150 produces a relevant hidden state of the hidden state space 118.

The Baum-Welch algorithm is an expectation-maximization (EM) approach used to train HHMs by iteratively tuning the transition matrix A, emission matrix B, and initial state distribution $\pi_0$ to maximize the likelihood of observed data. The algorithm operates in distinct phases: an initial phase that sets parameter values, a forward phase that calculates alpha functions representing the joint probability of observed data up to time k and the state at time k, a backward phase that computes beta functions representing the conditional probability of future observations given the current state, and an update phase that revises the parameters based on the computed probabilities. The forward and backward phases constitute the E-step of the EM algorithm by computing expected hidden states given observed data and current parameters, while the update phase forms the M-step by adjusting parameters to best fit the observed data and expected hidden states. This iterative process continues until parameters converge or the model reaches a specified accuracy requirement, effectively learning the underlying structure of sequential data where the true states are hidden but generate observable outputs.

In an aspect, a predicted hidden state may be predicted by a trained HHMM employed by the training module 114 whereby multiple levels of hidden states may be observed from the taxonomically structured data. The predicted hidden state may be associated with a node in the hierarchical taxonomy 110 including an intent category 112. The recommendation service 107 may use the trained HHMM to identify the predicted hidden state of the hidden state space 118.

Predicted hidden states may be determined by the recommendation service 107 by identifying the underlying patterns within the hidden state space 118. A most probable next hidden state using the trained HHMM may be determined to select the predicted hidden state. In one aspect, the most probable next hidden state may be determined by the recommendation service 107 using a Viterbi algorithm to determine the most likely state path, wherein the most probable next hidden state is on the most likely state path. In another aspect, the most probable next hidden state may be identified by the recommendation service 107 using the trained HHMM based on the predicted hidden state using a Forward-Backward algorithm to determine the most probable next hidden state.

In an aspect, the recommendation service 107 may be configured to generate the recommendation based on the most probable next hidden state. The user input and the most probable next hidden state may be provided to a language model in a prompt requesting a suggestion whereby the client devices 150 may receive the recommendation from the language model. The recommendation may be provided to the client devices 150 based on finding the best information and/or parameters (e.g., transition probabilities, emission probabilities, etc.) The user input may be comprised of any interaction with a user interface of the client devices 150 as described above.

In some aspects, the prompt includes the hidden state, including the topic and intent category, one or more examples of a good recommendation, and task instructions. An example of a prompt is:

<<You are a helpful agent. Using the inferred hidden state (Topic, Intent) from the TH2M2 model, generate a relevant follow-up question or recommendation for the user.

Context: The current hidden state is determined to be (HR-Family Support Time, Information Seeking).

Examples: If the hidden state is (HR→Vacation Policies, Information Seeking), a good recommendation would be: "Would you like to submit a vacation request now?" If the hidden state is (HR→Family Support Time, Information Seeking), good recommendations would be: "You may be eligible for California Paid Family Leave, would you like to know more about that?" and "You could opt for Unpaid Family Care Leave, would you like to know more about that?"

Task: Generate a concise, natural language question or recommendation that aligns with the user's inferred intent and topic, guiding them towards the next logical step. The output should directly present the recommended question or action.>>

Generating Recommendations

Figure 2:
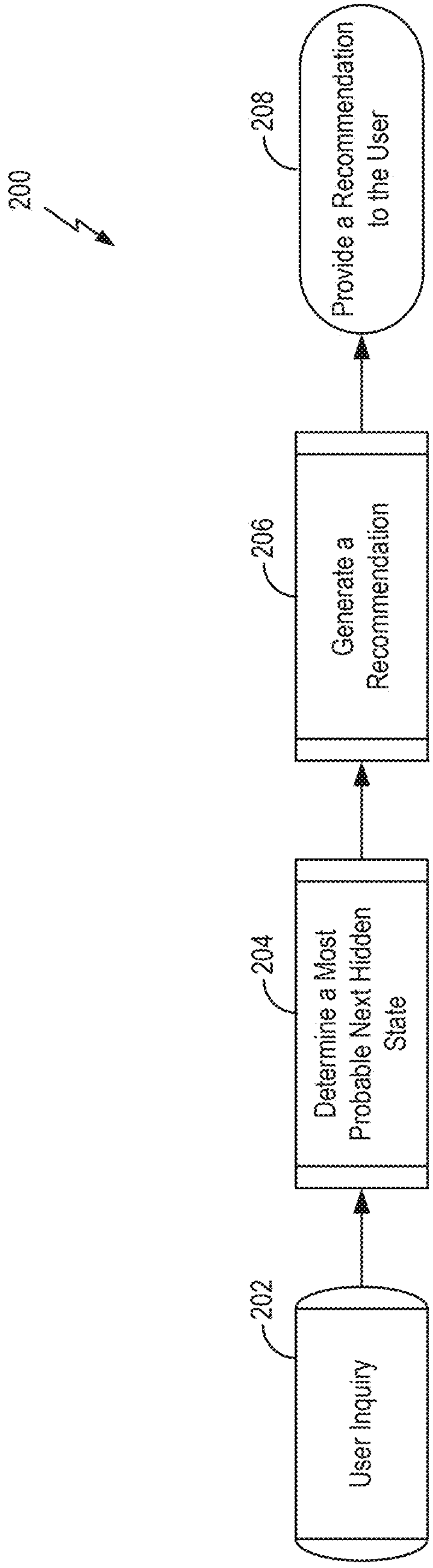
FIG. 2 depicts a schematic flow chart diagram illustrating an example method for generating a recommendation.

FIG. 2 depicts a flowchart diagram 200 of a process for generating a recommendation. In some aspects, the operations of flowchart diagram 200 may be performed by a processing system or apparatus, such as the hosts 102 of FIG. 1A and/or processing system 800 of FIG. 8. A user query 202 may be provided to or obtained by the processing system. The user query 202 comprises user input that is received at a user interface, such as one of the client devices 150 of FIG. 1A. The user interface is configured to facilitate a user's interaction with user application (e.g., an automated assistant, etc.). For example, a user may access a chat box user interface associated with or provided by the user application and submit a user query 202 that prompts the user application to help with enterprise information.

A user query is any input, message, or action provided by a user to the system that serves as an observable signal for the recommendation process. Within the taxonomy-boosted hierarchical hidden Markov modeling framework, user query 202 may take the form of a natural language utterance or question submitted through a chat interface, such as "How much vacation time do I have left?" It may also include commands or requests to perform specific actions, selections or clicks within a user interface, or any other interaction or observable behavior that can be processed by the system. The user query 202 functions as the observed state, or observation, in the hidden Markov model, providing the necessary information for the system to infer the underlying hidden state, which is defined by a combination of a taxonomy node and an intent category. Accordingly, the user query 202 may be used to determine a most probable next hidden state, at action 204.

In an aspect, determining a most probable hidden state may be provided upon processing the user input of the user query 202 with a trained classification model, such as classification model 116 of FIG. 1B. Leveraging a trained classifier allows the recommendation service to map a hidden state of a sequence model to a specific class label (e.g., Human Resources Recruitment). The predicted hidden state may be associated with a trained HHMM whereby relationships and entities may be identified based on the user query 202 of a hierarchical taxonomy of enterprise knowledge as discussed above in FIG. 1B. The trained HHMM may be employed to provide text analysis by modeling the structure of natural language at different levels and by including an intent category to the hierarchical taxonomy to enhance the predicted hidden state (e.g., Human Resources Recruitment, action performing) to initiate the process of interviewing a candidate.

Determining the most probable next hidden state may be achieved by processing a combination of a plurality of nodes in a hierarchical taxonomy, structured in a tree-like classification system, which may be organized according to information assets within an organization (e.g., HR, IT, Marketing, etc.). The hierarchical taxonomy of enterprise information may enable more efficient search, retrieval, and analysis of enterprise knowledge. The hierarchical taxonomy may provide a framework for consistent information management and governance across the enterprise by organizing entities in a parent-child relationship with broader categories at the top and more specific categories at the lower levels whereby reducing redundancy and minimizing duplication of data and information.

According to the disclosed aspects described herein, determining the most probable next hidden state includes using a trained HHMM Each hidden state in a hidden state space of a HMMM may have its own transmission and emission probabilities. Hidden states may be refined by determining transitions within a current hierarchical level and potentially higher or lower levels. A state may represent a sub-model that further refines the hidden state space. The recommendation service may calculate the probability of reaching each possible hidden state from all possible previous states and consider the transition and emission probabilities. The most probable path leading to each state may be stored in the memory of the hosts 102 and may be used for further iterations.

When determining the next hidden state within the HMMM's hidden state space, an algorithm (e.g., Viterbi, Forward-Backward, etc.) may be employed to calculate a probability for developing a recommendation. A recommendation may be provided by predicting a most likely sequence of hidden states to be generated given a sequence of observations. The probability of a hidden state needed for a future time may be calculated by observing data up to the current time. In one example, by developing a probability distribution over the hidden states at a future step, a hidden state may be selected with the highest probability. The most probable next hidden state, in a most likely sequence, may be determined by identifying the overall optimal sequence of steps. The most probable next hidden state in that sequence is the predicted hidden state.

The recommendation service is configured to generate a recommendation 206 based on the predicted hidden state and provide the recommendation 206 to a user. In some aspects, providing a recommendation to the user 208 is performed via the client devices 150 of FIG. 1A. Once the individual user preferences (e.g., taxonomy domain and user intent) are inferred, recommendations may be personalized and relevant. The trained HHMM may help with data sparsity where there is limited historical data for a user and to go beyond simply suggesting items based on past interactions. By providing a recommendation to the user, the user's needs may be anticipated, and preferences may be addressed in a more sophisticated and dynamic approach, leading to more accurate and effective recommendations.

As an example, a user may interact with an enterprise chatbot and asks, "How much vacation time do I have left?" and then follows up with, "Can I use some of it next week?" In this scenario, the first query is an information seeking intent related to the HR→Benefits→Vacation sub-domain, while the second query shifts to an action performing intent within the same sub-domain.

A conventional HMM, which typically models only a single label per hidden state (such as just the topic or just the intent), would have difficulty distinguishing between these two intents if the language is similar or if both queries mention "vacation." As a result, it might provide a generic response or fail to recommend the next logical action, such as initiating a vacation request.

In contrast, the taxonomy-boosted hierarchical hidden Markov model (HHMM) explicitly models both the taxonomy node (HR→Benefits→Vacation) and the intent category (information seeking vs. action performing) in its hidden state space. This allows the HHMM to recognize the transition from an information request to an action request within the same domain (e.g., topic). As a result, the HHMM can accurately recommend the next step, such as prompting the user to submit a vacation request form, based on the user's evolving intent and context, providing a more relevant and effective recommendation than a conventional HMM.

Training a Hierarchical Hidden Markov Model for Generating Recommendations

Figure 3:
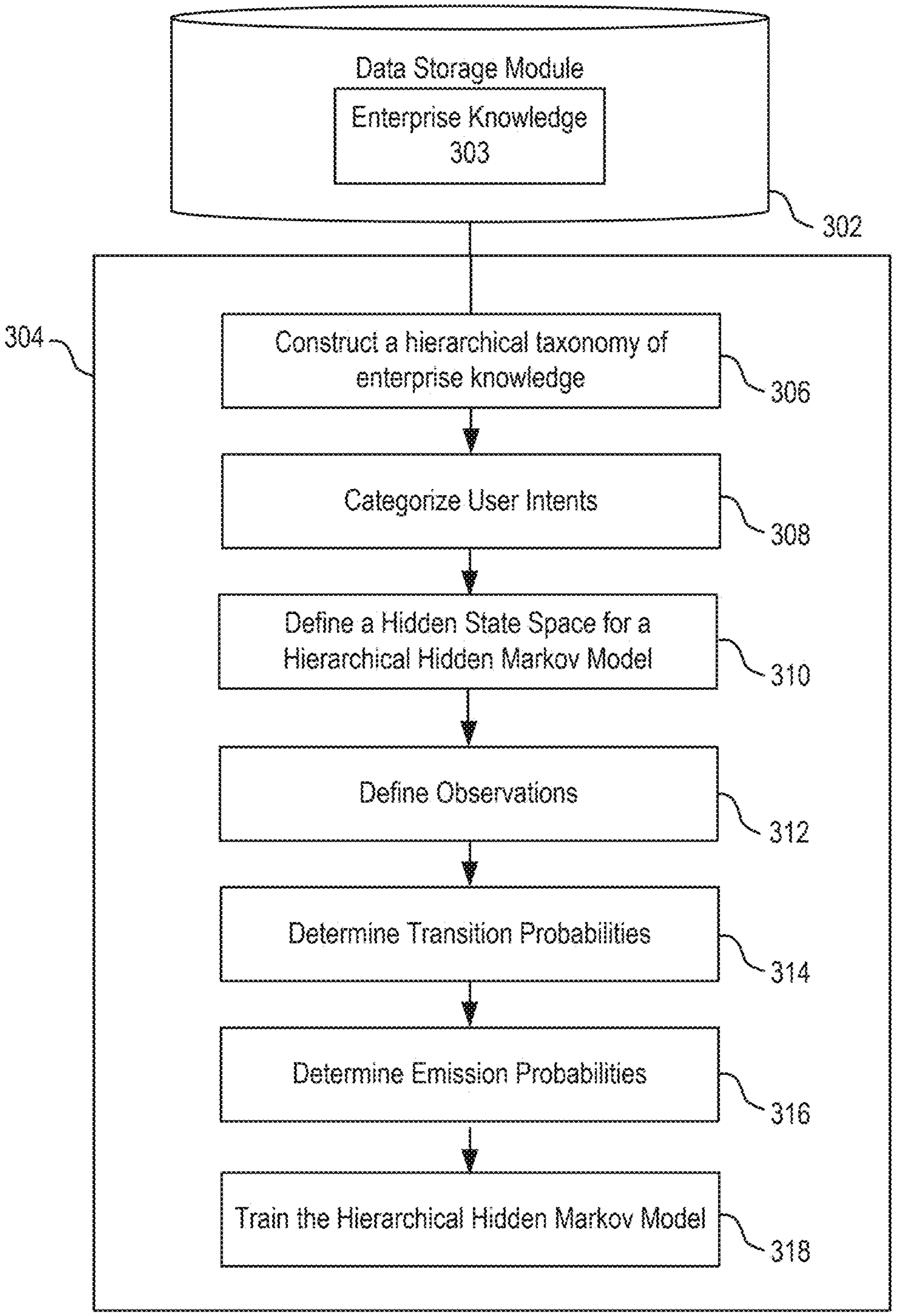
FIG. 3 depicts a schematic flow chart diagram illustrating an example method for training a model.

FIG. 3 depicts a process 304 for training a HHMM for generating recommendations. As shown in FIG. 3, a data storage module 302 stores the enterprise knowledge 303. In some aspects, data storage module 302 is comparable to storage 106 of FIG. 1A. In some aspects, the data storage module 302 may be a centralized repository that may store raw data from various sources without a predefined schema or may store structured data.

Enterprise knowledge 303, comparable to enterprise knowledge 108 of FIG. 1B, may include data (e.g., text, images, audio, etc.) stored in databases and designed to be queried using high dimensional vectors. Semantic search within the data storage module 302 may be enabled for search based on meaning and context using the high dimensional vectors, rather than just keywords found in the enterprise knowledge 303. The data storage module 302 may provide means for performing a similarity search for finding items similar to a given query based on vector proximity.

Constructing a Hierarchical Taxonomy

Enterprise knowledge stored in the data storage module 302 is used to construct a hierarchical taxonomy of the enterprise knowledge 303, for example at action 306, to provide effective knowledge management and improved information retrieval of data. The scope and granularity of the hierarchical taxonomy may be constructed to correspond to one or more levels of detail associated with the enterprise knowledge 303. The hierarchical taxonomy may be configured to establish a high-level hierarchical structure to identify the top-level categories of the branches (e.g., HR, Marketing, IT, etc.). In some aspects, the hierarchical taxonomy may define the relationships between concepts, such as building parent-child relationships within the hierarchy. In some aspects, the hierarchical taxonomy may aid in identifying related concepts and establish relationships (e.g., synonyms, related terms, etc.). For example, within the hierarchical taxonomy, the term "paid time off" may be identified as related to "vacation leave" and "personal days," allowing the system to recognize these as synonymous or closely related concepts when processing user queries, even if different terminology is used. As another example, the hierarchical taxonomy may link the term "IT support" with related concepts such as "technical assistance," "help desk," and "troubleshooting," enabling the system to interpret user queries about any of these terms as referring to the same or similar support services within the organization.

Constructing a hierarchical taxonomy of enterprise knowledge is focused on understanding a user's needs and behavior throughout the interaction with a user application. In some aspects, artificial intelligence powered categorization and tagging tools may be employed to scale maintenance of the hierarchical taxonomy, including managing and updating nodes and node relationships within the hierarchical taxonomy. In some aspects, the hierarchical taxonomy may need to be updated based on new or modified data included in enterprise knowledge 303. The hierarchical taxonomy may also be updated based on user feedback and usage data.

Categorizing User Intents

At action 308 of FIG. 3, the recommendation service is configured to categorize user intents, which involves analyzing user queries, such as user query 202 of FIG. 2, to determine the underlying purpose or goal behind each interaction. In some aspects, the recommendation service is configured to analyze a user query to examine the keywords and phrases that a user is searching for within the enterprise knowledge. The keywords and phrases may provide insights into the user needs and how they are formulating their queries. The recommendation service may be configured to map user tasks and workflows to detail the key tasks that different user groups perform and how they interact with enterprise knowledge to complete those tasks. In some aspects, usage patterns may be used to identify popular content and search query trends in order to understand user behavior and identify common information needs. Intent categorization models may be employed to automatically categorize user queries into intent categories to improve the accuracy and efficiency of recommendations. The recommendation service assigns each user query to an intent category, such as information seeking, action performing, or small talk intent categories. Some other examples of intent categories may include troubleshooting (for help in resolving a specific issue), feedback providing (for providing user feedback), or user escalation (for when a user requests to be connected to a human agent or higher-level support).

When users seek to gain knowledge, learn about a topic, or find answers to specific questions, user queries may be categorized as information seeking. Some examples of user queries that may be categorized as information seeking include when a user may seek to understand a process or a procedure within an organization (e.g., "How to submit a travel expense report?"), when a user may seek to learn about a company policy (e.g., "What is the policy on vacation time?"), or when a user may research a product or a service (e.g., "Features of the new CRM software."). In some aspects, users may be looking for a specific website, internal page, or documents within the enterprise knowledge base.

When users intend to initiate or complete a specific task, user queries may be categorized as action performing. For example, a user may request to submit a form or application within the organization (e.g., "Submit a travel expense report"), or may seek to enroll in a benefits program (e.g., "Sign me up for health insurance"). In another example, a user may wish to schedule a meeting or appointment (e.g., "Book a meeting with HR"), or initiate a support request (e.g., "Open a ticket for my laptop issue"). Users may also seek to perform or have the user application perform actions, such as updating personal information, approving requests, or executing transactions within enterprise systems. Thus, action performing queries reflect the user's intent to go beyond simply obtaining information and instead interact with enterprise resources to accomplish a specific objective.

When users engage in interactional or non-task-oriented interactions, their queries may be categorized as small talk. For example, a user may greet the system with phrases such as "Hello" or "Good morning," or may inquire about the system's status with questions like "How are you today?" In other instances, users may make casual remarks or jokes (e.g., "Tell me a fun fact" or "Do you like coffee?"), or comment on the weather or current events. Small talk queries are not intended to seek information or perform actions related to enterprise processes, but rather to establish rapport, create a friendly atmosphere, or simply interact with the system in a more human-like manner. Recognizing small talk allows the system to respond appropriately, maintaining a natural and engaging user experience even when the interaction is not directly related to specific objectives.

Categorizing user intents into distinct intent categories provides significant technical benefits by enabling the system to more accurately interpret and respond to user interactions. By classifying user inputs according to intent categories-such as information seeking, action performing, or small talk, the recommendation service can determine the user's underlying goals, even when similar language is used across different contexts.

For example, a user might enter the phrase "I need help with my benefits." In one context, the user may be seeking information about available benefits (information seeking intent), while in another context, the user may want to initiate an action, such as enrolling in a benefits program (action performing intent). Without intent categorization, the system might treat both queries the same and provide only generic information. However, by classifying the user's input into a specific intent category, the system can interpret the subtle differences in user goals and provide a more targeted response, such as offering detailed benefit information for an information-seeking intent or presenting enrollment options for an action-performing intent. This capability is especially important in enterprise environments where users may use similar language to express a variety of needs.

This structured approach allows the HHMM to differentiate between users who are merely requesting information and those who wish to initiate an action or engage in casual interaction, which is a technical improvement over existing HMMs which treat user queries as a single-dimensional input and therefore cannot accurately capture the full range of user intentions within complex, multi-domain enterprise environments. As a result, the system can tailor its recommendations and responses to better align with the user's actual needs, improving both the relevance and effectiveness of the interaction. Additionally, intent categorization enhances the model's ability to learn transition patterns between different types of user behavior, leading to more accurate predictions of future actions and more proactive, context-aware recommendations.

Defining a Hidden State Space

In addition to being configured to define and categorize user intents (e.g., information seeking, action performing, small talk, etc.), the recommendation service is also configured to label the user intents in one or more hidden states of a hidden state space of a hierarchical hidden Markov model, such as hidden state space 118 of FIG. 1B, as illustrated at by action 310. In conventional HMMs, each hidden state corresponds to a single label. Representing each hidden state with only a single label fails to capture the complexity of real-world user interactions, especially in enterprise environments where both the topic and the user's intent are critical for understanding context. As a result, conventional HMMs are limited in their ability to model multi-dimensional user behavior, leading to less accurate predictions and less relevant recommendations when users shift between topics or intents within an interaction.

Accordingly, the disclosed aspects herein are directed to a recommendation service that defines a hidden state space for a HHMM (action 310). In one example, each hidden state in the HHMM is associated with a domain of the hierarchical taxonomy and a user intent. In some aspects, each hidden state in the hidden state space may be associated with a node in the hierarchical taxonomy as described above in FIGS. 1A-1B. Hidden states can be organized into multiple hierarchical levels, creating a nested structure within the hierarchical hidden Markov model. This arrangement allows the model to represent both broad domains and more specific sub-domains, enabling more precise tracking of user context and intent throughout an interaction. In some aspects, the multiple hierarchical levels correspond to the hierarchical levels of the hierarchical taxonomy built at action 306.

Accordingly, the hidden states within each hierarchical level may include domains and sub-domains of the enterprise knowledge and user intents. For example, a hidden state in the hidden state space may represent the combination of the Human Resources domain and the Information Seeking intent. In another instance, a hidden state may correspond to Information Technology domain, hardware issues sub-domain, and action performing intent. Similarly, a hidden state could represent the marketing domain, social media sub-domain, and small talk intent. In some aspects, the hidden state space of the HHMM includes a number of hidden states defined by the number of taxonomy nodes multiplied by the number of intent categories.

Defining Observations

At action 312, the recommendation service defines observations, such as user activity or user messages. In particular, defining observations involves identifying and structuring the various types of user interactions that serve as the observable signals for the model. Observations are not limited to textual inputs; they may encompass a wide range of user activities, including natural language utterances, typed questions, voice commands, selections or clicks within a user interface, and navigation events such as moving between different sections of an application. Each of these observable actions provides valuable information about the user's current focus and intent and is treated as an input that the system can process to infer the underlying hidden state.

To effectively map observations to hidden states, the recommendation service may employ a combination of machine learning classifiers and embedding-based similarity measures. For example, when a user submits a query, the system can use a trained classification model to predict the most likely combination of taxonomy node and intent category associated with that input. Additionally, the system may compare the new user input to a database of previously labeled examples using techniques such as sentence embeddings and cosine similarity. This allows the system to assess not only exact matches but also semantically similar queries, thereby improving its ability to handle the diversity and nuance of natural language.

By capturing a comprehensive set of user behaviors and mapping them to the appropriate hidden states, the system ensures that both the topic and the intent behind each interaction are accurately represented. This, in turn, enables the model to make more informed inferences about the user's needs and to generate recommendations that are contextually relevant and personalized. Furthermore, by continuously updating the set of observations with new user data and feedback, the system can adapt to evolving user behaviors and maintain high levels of accuracy and responsiveness in dynamic enterprise environments.

Determining Transition Probabilities

At action 314, the recommendation service is configured to determine transition probabilities from a first hidden state to a subsequent hidden state in the hidden state space. A transition probability is the likelihood that the system will move from one hidden state to another hidden state within the hidden state space, based on observed user interactions. Because the HHMM may have a hidden state space where the states (e.g., domain, sub-domain, and intent) are organized into layers or levels, transitions may occur within a level or between levels. Transitions within a level may be represented by moving from one sub-domain to another within the same domain. Transitions between levels may be represented by moving from a sub-domain to a domain or domain to domain. Determining the transition probabilities in the HHMM may involve defining these probabilities at each level of the hidden state space and using algorithms (e.g., Baum-Welch) to learn these probabilities from the data.

For example, a user may inquire in a user application service, such a question-answer plugin, about a topic in a first domain while remaining on that topic but changing the intent of the query during the dialogue (e.g., from information seeking to action performing). In another example, the user may begin inquiring about Human Resources and change the topic to a query about Marketing. By providing the enterprise knowledge in a hierarchical taxonomy, transitions may be constrained by the recommendation service to more likely paths as defined in the hierarchical taxonomy. In one example, the recommendation service may calculate that it is more probable for a user inquiring about employee benefits in the human resources domain to switch to payroll in the human resources domain than to inquire about hardware issues in the information technology domain.

A transition probability is determined for each possible pair of hidden states in the hidden state space, representing the likelihood of transitioning from one hidden state to another. In particular, a probability value is assigned to each hidden state. This probability represents the likelihood that the hidden state may be selected as a most probable hidden state to be employed for a recommendation. In some aspects, the probability may be actively adjusted as a user's topic domain or one or more intent changes throughout the user's inquiries. The transition probabilities may be determined by considering the relationships between states at different levels of the hierarchy. The probability of transitioning from one sub-domain or intent to another depends on the parent state (e.g., domain) and the specific hierarchical structure of that domain. In some aspects, transition probabilities may be obtained from data using algorithms (e.g., Baum-Welch, Expectation-Maximization, etc.)

Determining Emission Probabilities

At action 316, the recommendation service is configured to determine emission probabilities based on an observed user message or activity via the client devices 150. An emission probability is the likelihood that a given hidden state produces a particular observed user message or activity. In order to determine emission probabilities, the recommendation service is configured to categorize sample utterances, estimate the frequency associated with each hidden state, and train a machine learning classifier. In some aspects, the recommendation service uses an embedding-based similarity to measure how closely a new input matches a labeled example for each hidden state. By labeling sufficient real examples, the recommendation service is able to generate a distribution over user messages for each hidden state.

In some aspects, the recommendation service utilizes a machine learning classifier, such as a text classifier, to assign the emission probabilities to the hidden states associated with a given user query. In some aspects, emission probabilities may be learned from training the machine learning classifier on a set of training data. The training data includes sequences of historically observed user queries labeled with the likely domain, sub-domain, and intent.

As described above, the HHMM may model data structured in the hierarchical taxonomy of enterprise knowledge whereby the information may be arranged into nested sequences that represent the hierarchical relationships to be modeled. Thus, a text classification model may be employed to classify sentences as a higher-level sequence and words within each sentence as the lower-level sequence associated with the levels of the hierarchical taxonomy. The text classification model may clearly define the parent-child relationships by processing the text data, breaking it down into smaller units, and extracting relevant features from these tokens that may serve as observable utterances for the HHMM.

In some aspects, estimating emission probabilities is performed using maximum likelihood estimation, which involves analyzing labeled training data to determine how frequently each observed user message or activity occurs when the system is in a particular hidden state. By counting the number of times, a specific observation is associated with a given hidden state and dividing by the total number of occurrences of that hidden state, the recommendation service can estimate the probability that the observation will be emitted from that state. Therefore, the emission probability for an occurrence of a state may be estimated as the frequency of that occurrence within the hidden state.

For some hidden states, the emission probability may represent how likely a certain type of message may appear for a respective hidden state. For example, a user of a dialogue system may ask, "How do I enroll for health insurance?" The corresponding hidden state (e.g., human resources, employee benefits, information seeking) may be identified. In another example, the user may state via the client devices 150, "Sign me up for a new marketing campaign." The corresponding hidden state (e.g., marketing, campaign management, action performing) may then be identified.

Training a Hierarchical Hidden Markov Model

At action 318, the recommendation service is configured to train a hierarchical hidden Markov model. In particular, the recommendation service gathers user interactions associated with the user application service, such as a question-answer plugin. In some aspects, the user interactions are labeled with a corresponding domain and intent for each user query included in the user interactions. Next, the recommendation service initializes the parameters of the HHMM corresponding to the transition and emission probabilities. The transition and/or emission probabilities may be initialized based on heuristics and/or a small, labeled dataset.

Training algorithms, such as Baum-Welch, are applied to the HHMM and allow the model to learn the transition and emission probabilities from the labeled, or partially labeled, training dataset.

In some aspects, when training the HHMM to estimate emission probabilities, the recommendation service does not simply count each occurrence of a user input as a whole number. Instead, the recommendation service uses a similarity score—such as the confidence score from a classifier or an embedding-based cosine similarity between the user input and labeled examples—to increment the count for each hidden state. This approach allows the model to account for the varying degrees of similarity between user inputs and known examples, thereby better capturing the diversity and nuance of natural language expressions in the training data.

In the training phase, cosine similarity may be used to extract features from historical data (e.g., gathered user interactions with labeled domain and intent) by comparing observation embeddings to a predicted criterion vector whereby patterns in the observation sequence may be captured. These extracted features may be used to train the HHMM parameters (e.g., transition and emission probabilities) using algorithms, such as Baum-Welch, etc.

Hidden states in the hidden state space correspond to the annotated user interactions and are enhanced by the extracted features from the utterances in the user interactions. An initial state probability may be provided to define the probability of starting in a hidden state. Transition probabilities may be provided to define the probability of transitioning from one hidden state to another hidden state in the hidden state space. An emission probability may be employed to define the probability of observing a particular feature vector given a specific hidden state in the hidden state space. The Baum-Welch expectation-maximization algorithm may estimate the HHMM parameters. Given a dialogue utterance (e.g., a sequence of observations) a Viterbi algorithm may be used to find the most likely sequence of hidden states based on the dialogue acts input via the client devices 150 that generated the observation sequences.

The trained HHMM may be integrated into a recommendation service coupled with a user application service for real-time user interaction classification. The classified user interactions may be used to inform the recommendation service, enabling the system to generate appropriate responses or actions. The HHMM may provide temporal modeling by capturing the sequential nature of dialogue whereby modeling the temporal dependencies between utterances therewith. Hidden structures may be identified by modeling unobservable, underlying structures (e.g., user intent and dialogue goals). The hierarchical taxonomy of enterprise knowledge may provide a principled framework for combining multiple knowledge sources and deriving model parameters from the data.

Hierarchical Taxonomy of Enterprise Knowledge

Figure 4A:
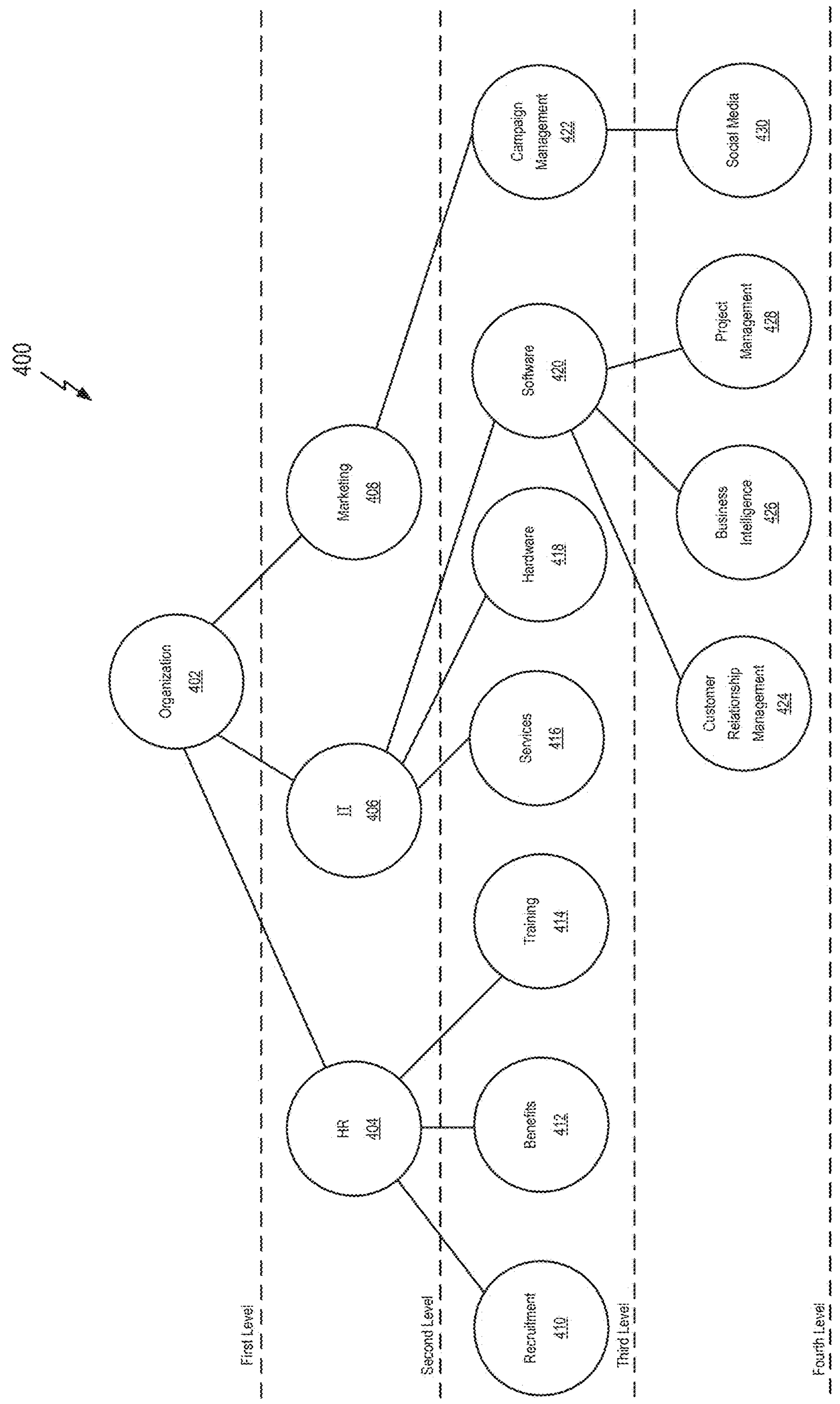
FIG. 4A depicts an example structure of a hierarchical taxonomy of enterprise knowledge.

FIG. 4A depicts an example structure of a hierarchical taxonomy of enterprise knowledge. In some aspects, hierarchical taxonomy 400 is comparable to hierarchical taxonomy 110 of FIG. 1B. As shown in FIG. 4A, hierarchical taxonomy 400 is depicted graphically as a tree structure but may be represented in other ways in other examples. Other ways to depict the hierarchical taxonomy may include representing the hierarchical taxonomy as a nested list, an indented outline, a directed acyclic graph (DAG) to allow for shared sub-domains, a table or matrix where rows and columns indicate parent-child relationships, or as a collapsible menu in a graphical user interface. Additionally, the hierarchical taxonomy could be visualized using a sunburst chart, a mind map, or a network diagram, each of which can be used to illustrate hierarchical relationships and connections between domains and sub-domains of enterprise knowledge in different formats.

As shown in FIG. 4A, hierarchical taxonomy 400 comprises a plurality of nodes that each represent a different topic described in the enterprise knowledge. The topics may be a domain or sub-domain of the enterprise knowledge. In some aspects, the plurality of nodes is organized according to various levels based on the parent-child relationships between the different nodes. At a first level, hierarchical taxonomy 400 comprises a root node representing an organization 402 that is associated with the enterprise knowledge. Thus, in some aspects, the first level may be referred to as the organizational level of the hierarchical taxonomy 400. At a second level, hierarchical taxonomy 400 comprises a plurality of domains associated with organization 402, including, for example, human resources (HR) 404, information technology (IT) 406, and marketing 408. In some aspects, the second level may be referred to as the domain level, or as the primary domain level.

At a third level, hierarchical taxonomy 400 comprises a first plurality of sub-domains associated with the plurality of domains of the first level of the hierarchical taxonomy 400. For example, HR 404, a domain at the first level, is associated with a set of sub-domains, including recruitment 410, benefits 412, and training 414. As another example, IT 406 is associated with another set of domains, including services 416, hardware 418, and software 420. Additionally, marketing 408 is associated with the sub-domain of campaign management 422. In some aspects, the third level of the hierarchical taxonomy 400 may be referred to as the sub-domain level, or as the secondary domain level.

At a fourth level, hierarchical taxonomy 400 comprises a second plurality of sub-domains associated with the first plurality of sub-domains at the third level. For example, software 420 is associated with a set of sub-domains, including customer relationship management 424, business intelligence 426, and project management 428. As another example, campaign management 422 is associated with at least one sub-domain, such as social media 430. In some aspects, the fourth level of the hierarchical taxonomy 400 may be referred to as the secondary sub-domain level, or as the tertiary domain level. While hierarchical taxonomy 400 is shown comprising four levels of hierarchy, hierarchical taxonomy 400 may comprise any number of levels of hierarchy, based on the content of the respective enterprise knowledge. Further, hierarchical taxonomy 400 may comprise any number of domains and any domain, or sub-domain, may be associated with any number of sub-domains, also based on the content of the respective enterprise knowledge.

Figure 4B:
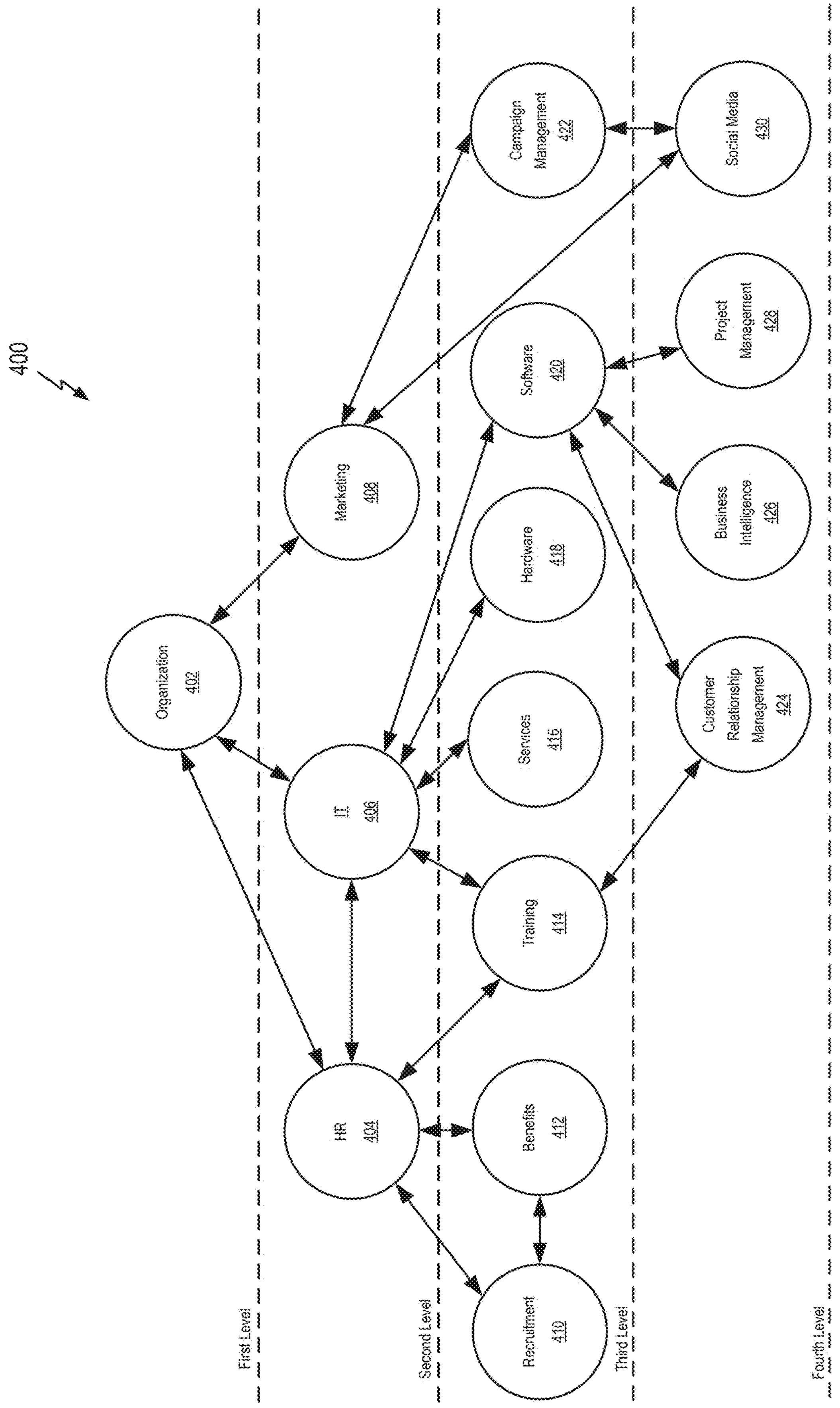
FIG. 4B depicts various example node paths between one or more nodes of hierarchical taxonomy of FIG. 4A that represent one or more topics referenced during a user interaction with a user application.

FIG. 4B depicts various example node paths between one or more nodes that represent one or more topics referenced during a user interaction with a user application, such as a question-answer plugin. During the same user interaction, whether a single or multi-query interaction, a user may traverse between various topics, including domain-domain, domain-sub-domain, and/or sub-domain-sub-domain topic traversals. In some examples, a user may traverse between topics within the same level, or may traverse between topics at adjacent levels, or may even skip one or more levels.

For example, in a first user query of a user interaction, the user may reference software 420, which is a sub-domain of IT 406 at the third level. In a second user query in the user interaction, the user may reference business intelligence 426, which is a sub-domain of software 420 at the fourth level. Thus, the user interaction is mapped as a sub-domain to sub-domain traversal between adjacent levels.

In another example, in a first user query, the user may reference HR 404, which is a domain at the second level. In a second user query, the user may reference marketing 408, which is also a domain at the second level. Thus, the user interaction is mapped as a domain-domain traversal at the same level. In yet another example, in a first user query, the user may reference benefits 412, which is a sub-domain of HR 404 at the third level. In a second user query, the user may reference training 414, which is also a sub-domain of HR 404 at the third level. Thus, the user interaction is mapped as a sub-domain to sub-domain traversal at the same level.

In a further example, in a first user query, the user may reference IT 406, which is a domain at the second level. In a second user query, the user may reference customer relationship management 424, which is a sub-domain of software 420 under IT 406 at the fourth level. Thus, the user interaction is mapped as a domain to sub-domain traversal that skips at least one level. In a first user query of a user interaction, the user may reference HR 404, which is a domain at the first level. In a second user query in the user interaction, the user may reference recruitment 410, which is a sub-domain of HR 404 and is at the second level. Thus, the user interaction is mapped as a domain to sub-domain traversal. Users may also traverse upwards through levels of the hierarchy, including switching from a sub-domain at a fourth level to a sub-domain at the third level, or a domain at the second level. In some examples, users may traverse between topics in a single user query, such as referencing a domain in a first part of a question and referencing a sub-domain in a second part of the question.

When using the hierarchical taxonomy to identify the intent of the user interaction and ultimately provide a recommendation to the user, the recommendation service will analyze the user interaction, including a first user query, and predicts which topic of the hierarchical taxonomy that the first user query references. Then, when the recommendation service analyzes a second user query, when making a prediction of which topic of the hierarchical taxonomy the second user query is referencing, the recommendation service will first look at only those topics (represented by nodes) are connected to the topic of the first user query based on edges between nodes, as shown in FIG. 4A.

When using the hierarchical taxonomy to identify the intent of a user interaction and generate a recommendation, the recommendation service first analyzes the user's initial query to predict which topic, as represented by a node of the plurality of nodes, in the hierarchical taxonomy the initial query references. For subsequent user queries within the same interaction, the recommendation service predicts the referenced topic by considering those nodes that are directly connected to the topic of the previous query, as defined by the edges between nodes in the hierarchical structure shown in FIG. 4A. In some aspects, the recommendation service considers only those nodes which are connected to the first identified node. In other aspects, the recommendation service will first consider the connected nodes but may consider other nodes if needed. The recommendation service may need to consider other nodes if a confidence score associated with predicting a topic of a subsequent user query does not meet a minimum confidence score.

In some examples, each node is associated with a set of (e.g., one or more) classification rules that govern how user input from a user query is mapped to a particular node path. When a user query is received via a client device, the system evaluates whether the input satisfies the rules defined for a specific node and, where applicable, the rules for each parent node along the path from the root node (e.g., Organization 402) down to the target sub-domain. In some aspects, these classification rules are hard classification rules, meaning that classification into a particular node path is permitted only if the input fully satisfies all relevant rules for both the sub-domain and its parent nodes. In other aspects, the taxonomy may include soft classification rules, which allow for some flexibility, where a violation of a soft classification rule does not entirely preclude classification into the corresponding node but may result in a lower confidence score or probability when determining the most appropriate node during emission probability calculations.

This approach enables the system to balance strict hierarchical classification with the ability to accommodate the variability and ambiguity often present in natural language user queries. In addition to rules, the hierarchical tree structure, or other forms of hierarchical structures for the nodes may also include or may be associated with other information pertinent to the nodes or rules. For example, the respective inquiries, normalized inquiries, additional information considered during classification (e.g., intent), etc. may be included or associated with the corresponding node in the hierarchical domain data structure such as the hierarchical taxonomy of enterprise knowledge as illustrated in FIGS. 4A-4B.

Structuring enterprise knowledge as depicted in FIGS. 4A-4B provides significant technical benefits by organizing information into a hierarchical taxonomy that reflects the relationships between domains and sub-domains within the organization. This tree-like structure enables efficient navigation and retrieval of information. By arranging knowledge in multiple levels of granularity, the recommendation service can support topic traversals between topics within the same level, or topic traversals between topics at different levels. The hierarchical taxonomy 400 also facilitates the application of classification rules at each node, enabling precise mapping of user queries to relevant topics and intents. This structure supports scalable knowledge management, as new domains or sub-domains can be added without disrupting the overall organization.

Additionally, the hierarchical approach enhances the performance of machine learning models, such as HHMMs, by constraining transitions to more likely paths and improving the accuracy of intent and topic inference. By structuring the hidden state space according to the hierarchical taxonomy, the HHMM is able to constrain possible transitions between states to those that are contextually and organizationally relevant. For example, when a user is engaged in a conversation about employee benefits within the HR domain, the model is more likely to transition to related sub-domains, such as payroll or vacation policies, rather than to unrelated areas like IT hardware issues. This hierarchical constraint reduces the likelihood of improbable or irrelevant transitions, thereby narrowing the set of candidate next states and focusing the model's predictions on the most contextually appropriate options. As a result, the HHMM not only improves the efficiency of inference by limiting the search space within the hidden state space but also increases the accuracy and relevance of its recommendations, ensuring that the mapping of user interactions follow a natural and logical progression within the enterprise knowledge structure.

Further, constraining transitions according to the hierarchical taxonomy helps the system provide recommendations that are more relevant and contextually appropriate to the user's current needs. By limiting possible next states to those that are logically connected within the enterprise knowledge structure, the HHMM avoids suggesting unrelated or out-of-context actions or information. This ensures that recommendations are aligned with the user's ongoing conversation and likely intentions, resulting in a smoother, more intuitive user experience and reducing the risk of user confusion or frustration. Ultimately, this approach enables the system to anticipate user needs more accurately and deliver recommendations that are both timely and meaningful within the context of the user's interaction history. Overall, this method of structuring enterprise knowledge leads to improved information governance, more relevant recommendations, and a more intuitive user experience when interacting with complex organizational data.

Example of a Hidden State Space

FIG. 5 depicts an example of a hidden state space of a taxonomy-boosted HHMM that is associated with the hierarchical taxonomy 400 of FIGS. 4A-4B. The hidden state space 500 of FIG. 5 is illustrated as a structured data representation that defines the set of possible hidden states for the hierarchical hidden Markov model (HHMM) used in the recommendation service. The hidden state space 500 is organized as a table, with each row corresponding to a distinct hidden state defined by a combination of a topic and an intent category. The columns of the table represent the topic 501 and the intent category 502, and each row is associated with a specific hidden state, such as hidden state 504, hidden state 506, hidden state 508, hidden state 510, and hidden state 512.

The topic 501 column specifies the topic, such as the domain or sub-domain, from the hierarchical taxonomy of enterprise knowledge, such as hierarchical taxonomy 400 of FIG. 4A. For example, the topic 501 may include labels such as "HR→Recruitment," "HR," "IT→Hardware," or "IT→Software→Project Management." Each topic label corresponds to a node in the hierarchical taxonomy, and the granularity of the topic can range from high-level domains to more specific sub-domains, depending on the structure and content of the enterprise knowledge.

The intent category 502 column specifies the user intent associated with the topic 501 for each hidden state. The intent category 502 may include values such as "Action Performing," "Small Talk," or "Information Seeking." These intent categories may be predefined and are used to capture the purpose or goal behind the user's interaction with the system. Each intent category 502 is applicable across all topics in the taxonomy, allowing the hidden state space 500 to represent multi-dimensional user behavior.

As mentioned above, each hidden state, such as hidden state 504, hidden state 506, hidden state 508, hidden state 510, and hidden state 512, is defined by a specific combination of a topic 501 and an intent category 502. For example, hidden state 504 corresponds to the combination of "HR→Recruitment" as the topic 501 and "Action Performing" as the intent category 502. Hidden state 506 corresponds to "HR" as the topic 501 and "Small Talk" as the intent category 502. Hidden state 508 corresponds to "IT→Hardware" as the topic 501 and "Information Seeking" as the intent category 502. Hidden state 510 corresponds to "IT→Hardware" as the topic 501 and "Action Performing" as the intent category 502. Hidden state 512 corresponds to "IT→Software→Project Management" as the topic 501 and "Small Talk" as the intent category 502.

The hidden state space 500 may include additional rows to represent all possible combinations of topics and intent categories, as indicated by the ellipsis (" . . . ") in the table. In some aspects, the number of hidden states in the hidden state space is determined by the total number of unique combinations of hierarchical taxonomy nodes and intent categories. As a result, the total number of hidden states is equal to the number of taxonomy nodes multiplied by the number of intent categories, allowing the model to capture the full range of possible user contexts and intentions associated with the enterprise knowledge.

Example Methods for Generating User Recommendations

Figure 6:
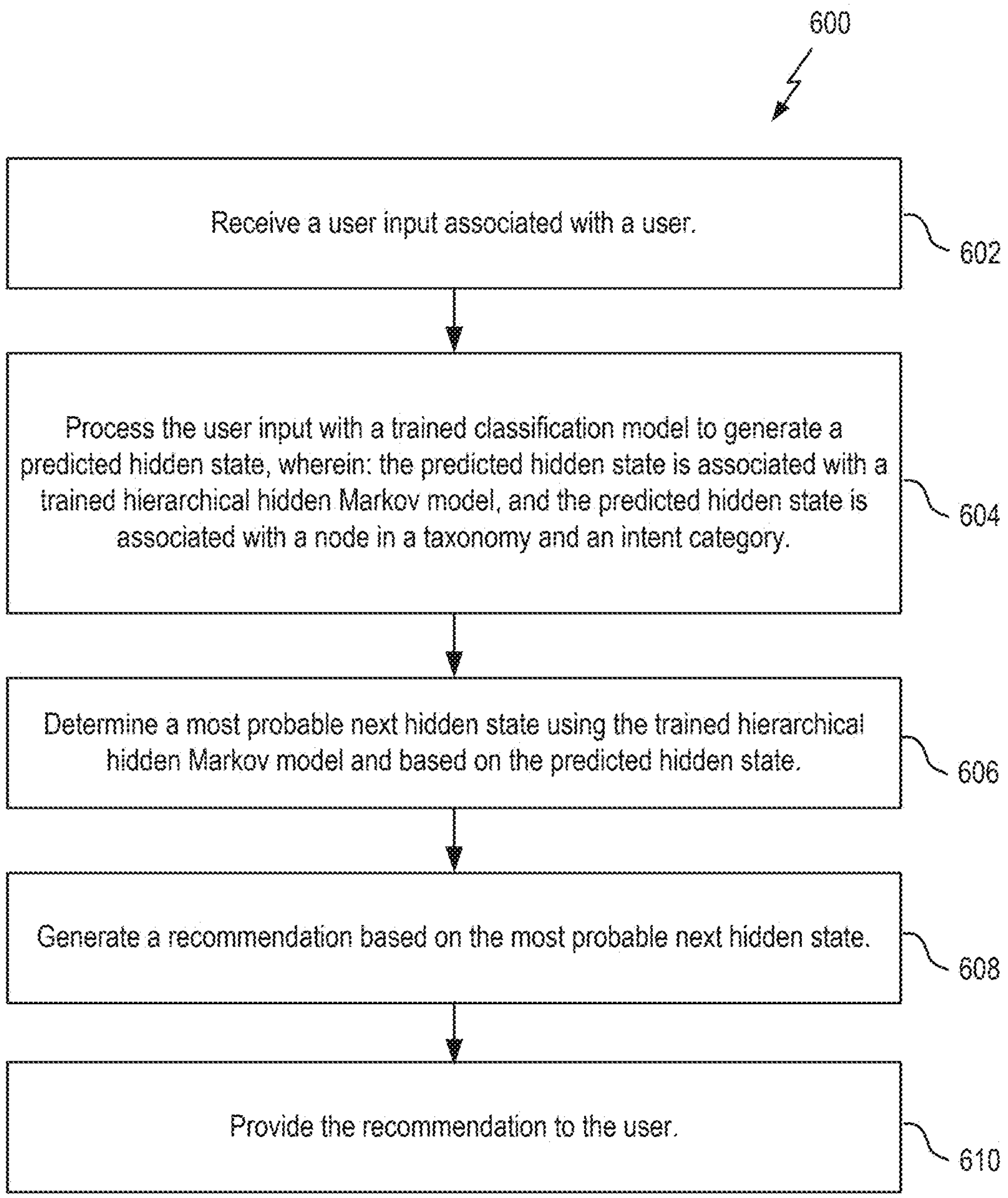
FIG. 6 depicts a schematic flow chart diagram of a method for recommendation inferences.

FIG. 6 depicts an example method 600 for generating user recommendations. In some aspects, method 600 may be implemented by processing system 800 of FIG. 8.

Figure 8:
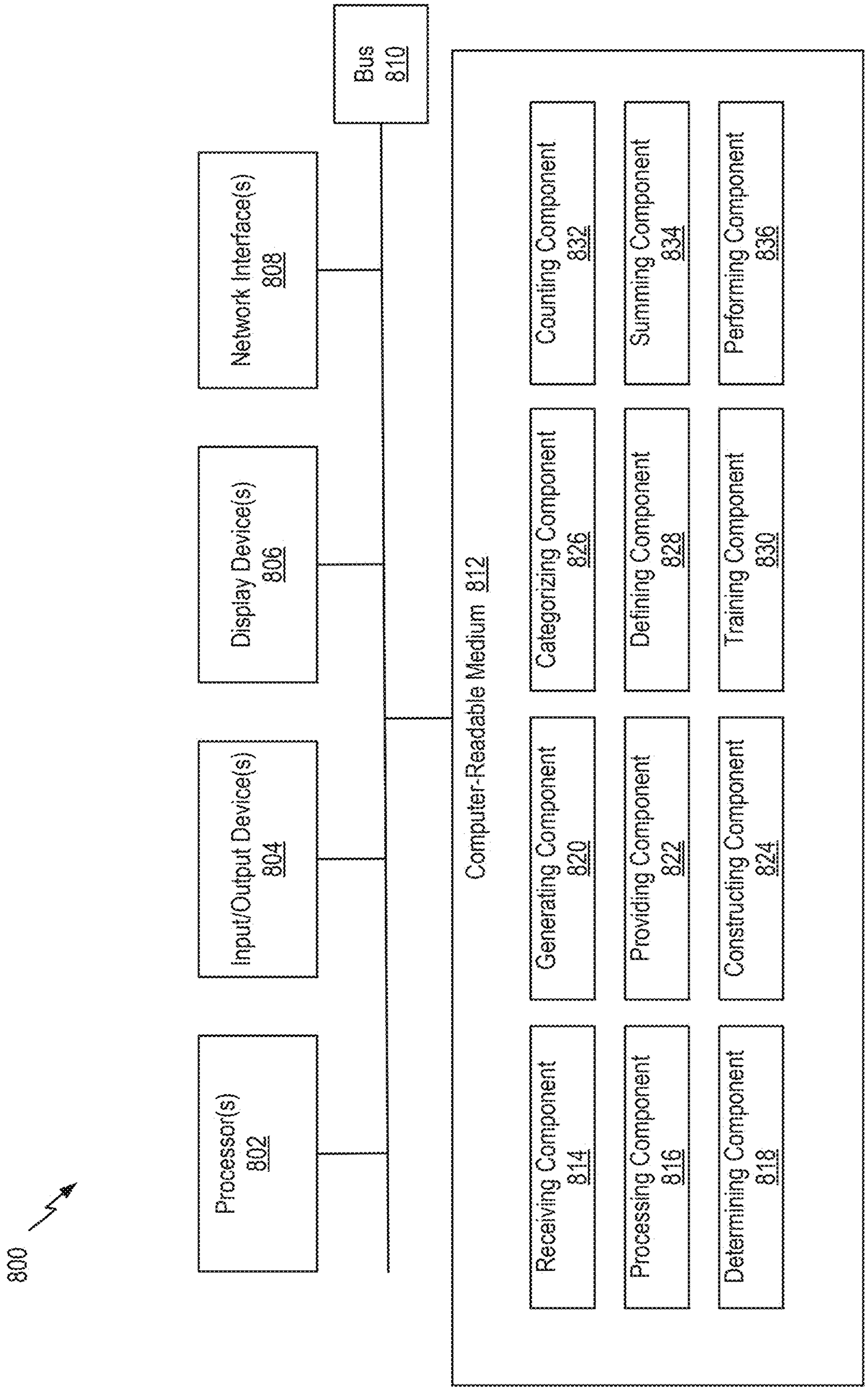
FIG. 8 depicts a block diagram illustrating an example processing system configured to perform the aspects described herein.

Method 600 starts at block 602 with receiving a user input associated with a user. In some aspects, receiving component 814 of FIG. 8 is configured to receive user input, such as user query 202 of FIG. 2, associated with a user.

Method 600 continues to block 604 with processing the user input with a trained classification model to generate a predicted hidden state, wherein: the predicted hidden state is associated with a trained hierarchical hidden Markov model, and the predicted hidden state is associated with a node in a taxonomy and an intent category. In some aspects, processing component 816 of FIG. 8 is configured to process the user input, such as user query 202 of FIG. 2, with a trained classification model, such as classification model 116 of FIG. 1B, to generate a predicted hidden state associated with a trained hierarchical hidden Markov model, wherein the predicted hidden state is associated with a node in a taxonomy, such as hierarchical taxonomy of enterprise knowledge depicted in FIG. 4A, and an intent category.

Method 600 continues to block 606 with determining a most probable next hidden state using the trained HHMM and based on the predicted hidden state. In some aspects, determining component 818 of FIG. 8 is configured to determine a most probable next hidden state using the trained hierarchical hidden Markov model, and based on the predicted hidden state generated from the user input, such as user query 202 of FIG. 2.

Method 600 continues to block 608 with generating a recommendation based on the most probable next hidden state. In some aspects, generating component 820 of FIG. 8 is configured to generate a recommendation based on the most probable next hidden state determined by the hierarchical hidden Markov model. In particular, the most probable next hidden state, in a most likely sequence, may be determined by identifying the overall optimal sequence of steps.

Method 600 continues to block 610 with providing the recommendation to the user. In some aspects, providing component 822 of FIG. 8 is configured to provide the recommendation to the user, such as by transmitting the generated recommendation to the client devices 150 shown in FIG. 1A.

In some aspects, method 600 includes providing the user input and the most probable next hidden state to a language model in a prompt requesting a suggestion; and receiving the recommendation from the language model. In some aspects, providing component 822 of FIG. 8 is configured to provide the user input, such as user query 202 of FIG. 2, and the most probable next hidden state, as determined using the hierarchical taxonomy 110 of FIG. 1B and hidden state space 118 of FIG. 1B, to a language model in a prompt requesting a suggestion, and to receive the recommendation from the language model for delivery to the client devices 150 of FIG. 1A.

In some aspects, method 600 includes using a Forward-Backward algorithm to determine the most probable next hidden state. In some aspects, determining component 818 of FIG. 8 is configured to use a Forward-Backward algorithm to determine the most probable next hidden state based on the predicted hidden state generated from the user input, such as user query 202 of FIG. 2, and the hierarchical taxonomy 110 of FIG. 1B and hidden state space 118 of FIG. 1B.

In some aspects, the user input, such as user query 202 of FIG. 2, comprises an utterance in a chat-based interaction with the user.

In some aspects, the user input, such as user query 202 of FIG. 2, comprises an interaction with a user interface element.

In some aspects, the taxonomy, such as hierarchical taxonomy 110 of FIG. 1B, represents enterprise knowledge and comprises a hierarchical plurality of nodes each corresponding to a domain, a sub-domain, or a topic category, as depicted in FIG. 4A.

In some aspects, the trained classification model is a multilayer perceptron model. In some aspects, processing component 816 of FIG. 8 is configured to process user input, such as user query 202 of FIG. 2, using a trained classification model, such as classification model 116 of FIG. 1B, wherein the classification model is implemented as a multilayer perceptron model to generate a predicted hidden state associated with the hierarchical taxonomy 110 of FIG. 1B and hidden state space 118 of FIG. 1B.

In some aspects, the intent category is one of a set if intent categories consisting of information seeking, action performing, or communicating. In some aspects, categorizing component 826 of FIG. 8 is configured to categorize the intent category as one of a set of intent categories-such as information seeking, action performing, or communicating-based on user input, such as user query 202 of FIG. 2, and in association with the intent categories defined in FIG. 1B.

Accordingly, aspects of method 600 depicted in FIG. 6 provide significant technical benefits over existing HMM methods by enabling a taxonomy-boosted HHHM. By systematically receiving user input, processing it with a trained classification model to generate a predicted hidden state, determining the most probable next hidden state using a HHMM, and generating recommendations based on this inference, the recommendation service can accurately interpret both the topic and intent behind user interactions. This approach leverages the structure of both the enterprise knowledge as organized in the hierarchical taxonomy and the intent categorization to deliver recommendations that are highly relevant and personalized, while also improving the efficiency and accuracy of information retrieval.

Note that FIG. 6 is just one example of a method, and other methods including, fewer, additional, or alternative operations are possible consistent with this disclosure.

Figure 7:
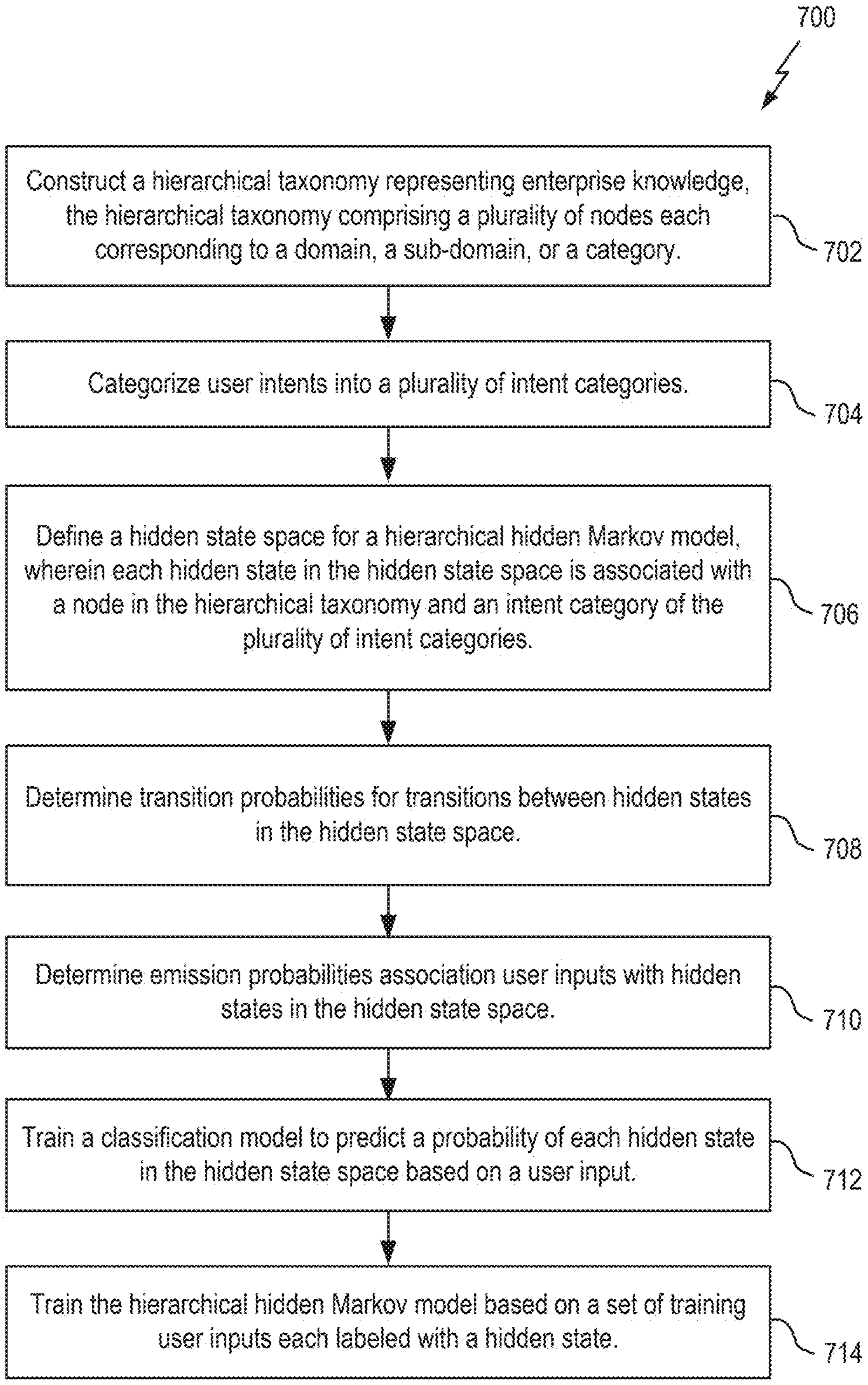
FIG. 7 depicts a schematic flow chart diagram of a method for processing data to generate transition and emission probabilities for machine learning model training.

FIG. 7 depicts an example method 700 for processing data to generate transition and emission probabilities for machine learning model training. In some aspects, method 700 may be implemented by processing system 800 of FIG. 8.

Method 700 starts at block 702 with constructing a hierarchical taxonomy representing enterprise knowledge, the hierarchical taxonomy comprising a plurality of nodes each corresponding to a domain, a sub-domain, or a category. This is described in connection with 306 in FIG. 3, where natural language models may be employed. In some aspects, constructing component 824 of FIG. 8 is configured to construct a hierarchical taxonomy representing enterprise knowledge, such as the hierarchical taxonomy 110 of FIG. 1B, where the taxonomy comprises a plurality of nodes each corresponding to a domain, a sub-domain, or a category as depicted in FIG. 4A and as described in action 306 of FIG. 3.

Method 700 continues to block 704 with categorizing user intents into a plurality of intent categories. In some aspects, categorizing component 826 of FIG. 8 is configured to categorize user intents into a plurality of intent categories based on user input, such as user query 202 of FIG. 2, in association with the intent categories and hierarchical taxonomy 110 depicted in FIG. 1B and as described in action 308 of FIG. 3.

Method 700 continues to block 706 with defining a hidden state space for a hierarchical hidden Markov model, wherein each hidden state in the hidden state space is associated with a node in the hierarchical taxonomy and an intent category of the plurality of intent categories. In some aspects, defining component 828 of FIG. 8 is configured to define a hidden state space for a hierarchical hidden Markov model, wherein each hidden state in the hidden state space is associated with a node in the hierarchical taxonomy 110 and an intent category of the plurality of intent categories, as depicted in FIG. 1B and illustrated in the hidden state space table of FIG. 5.

Method 700 continues to block 708 with determining transition probabilities for transitions between hidden states in the hidden state space. In some aspects, determining component 818 of FIG. 8 is configured to determine transition probabilities for transitions between hidden states in the hidden state space, such as the hidden state space 118 depicted in FIG. 1B and illustrated in FIG. 5.

Method 700 continues to block 710 with determining emission probabilities associating user inputs with hidden states in the hidden state space. In some aspects, determining component 818 of FIG. 8 is configured to determine emission probabilities associating user inputs, such as user query 202 of FIG. 2, with hidden states in the hidden state space 118 depicted in FIG. 1B and illustrated in FIG. 5.

Method 700 continues to block 712 with training a classification model to predict a probability of each hidden state in the hidden state space based on a user input. In some aspects, training component 830 of FIG. 8 is configured to train a classification model, such as classification model 116 of FIG. 1B, to predict a probability of each hidden state in the hidden state space 118 of FIG. 1B based on a user input, such as user query 202 of FIG. 2.

Method 700 continues to block 714 with training the HHMM based on a set of training user inputs each labeled with a hidden state. In some aspects, training component 830 of FIG. 8 is configured to train the HHMM based on a set of training user inputs each labeled with a hidden state in the hidden state space 118 of FIG. 1B.

In some aspects, method 700 includes based on the user input comprises for each hidden state in the hidden state space, estimating a probability of the user input. In some aspects, training component 830 of FIG. 8 is configured to, based on the user input such as user query 202 of FIG. 2, estimate a probability of the user input for each hidden state in the hidden state space 118 of FIG. 1B.

In some aspects, method 700 includes for each respective hidden state in the hidden state space, counting a number of training observations in a training data set for which a training observation is associated with the respective hidden state. In some aspects, counting component 832 of FIG. 8 is configured to, for each respective hidden state in the hidden state space 118 of FIG. 1B, count a number of training observations in a training data set for which a training observation is associated with the respective hidden state.

In some aspects, method 700 includes, for each respective hidden state in the hidden state space, determining a probability of the respective hidden state for each training user input in the set of training user inputs; summing probabilities for the respective hidden state for all training user inputs in the set of user inputs; and determining an emission probability for the respective hidden state based on the summed probabilities and a number of training user inputs. In some aspects, summing component 834 of FIG. 8 is configured to, for each respective hidden state in the hidden state space 118 of FIG. 1B, determine a probability of the respective hidden state for each training user input in the set of training user inputs, sum probabilities for the respective hidden state for all training user inputs in the set of user inputs, and determine an emission probability for the respective hidden state based on the summed probabilities and a number of training user inputs.

In some aspects, method 700 includes performing an expectation maximization algorithm. In some aspects, performing component 836 of FIG. 8 is configured to perform an expectation maximization algorithm for training the HHMM using training data associated with hidden states in the hidden state space 118 of FIG. 1B. In some aspects, the expectation maximization algorithm is a Baum-Welch algorithm.

Aspects of method 700 provide substantial technical benefits by training and deploying a taxonomy-boosted HHMM. By constructing a hierarchical taxonomy, categorizing user intents, defining a comprehensive hidden state space, and systematically determining transition and emission probabilities, the method enables the model to accurately capture the complexity and structure of enterprise knowledge and user behavior. The integration of machine learning classifiers and advanced probability estimation techniques further enhances the model's ability to interpret diverse user inputs and adapt to evolving usage patterns. These aspects result in a recommendation service that delivers more precise, contextually relevant, and actionable recommendations than existing HMM-based recommendation services, significantly improving the effectiveness and responsiveness of user application services.

Note that FIG. 7 is just one example of a method, and other methods including, fewer, additional, or alternative operations are possible consistent with this disclosure.

Example System for Generating Recommendations

FIG. 8 depicts an example system 800, which is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processor(s) 802, one or more input/output device(s) 804, one or more display device(s) 806, one or more network interface(s) 808 through which processing system 800 is connected to one or more networks (e.g., a local network, an intranet, the Internet, or any other group of processing systems communicatively connect to each other), and computer-readable medium 812. In the depicted example, the aforementioned components are coupled by a bus 810, which may generally be configured for data exchange amongst the components. Bus 810 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain aspects, processor(s) 802 are representative of one or more central processing units (CPUs), graphics processing units (GPUs), tensor processing units (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user.

Display device(s) 806 may generally include any sort of device configured to display data, information, graphics, user interface elements, and the like to a user. For example, display device(s) 806 may further include displays for devices, such as augmented, virtual, and/or extended reality devices. In various aspects, display device(s) 806 may be configured to display a graphical user interface.

Network interface(s) 808 provide processing system 800 with access to external networks and thereby to external processing systems. Network interface(s) 808 may generally be any hardware and/or software capable of transmitting and/or receiving data via a wired or wireless network connection. Accordingly, network interface(s) 808 may include a communication transceiver for sending and/or receiving any wired and/or wireless communication.

Computer-readable medium 812 may be a volatile memory, such as a random-access memory (RAM), or a nonvolatile memory, such as nonvolatile random-access memory (NVRAM), or the like. In this example, computer-readable medium 812 includes the following processing components: receiving component 814, processing component 816, determining component 818, generating component 820, providing component 822, constructing component 824, categorizing component 826, defining component 828, training component 830, counting component 832, summing component 834, and performing component 836. These processing components may enable and cause the processing system 800 to perform the method 600 described with respect to FIG. 6 and the method 700 described with respect to FIG. 7, or any aspect related to them.

Receiving component 814 is configured to capture user inputs, such as queries, commands, or interface interactions, from various sources including text, voice, or clicks, and to provide these inputs as observable states to processing component 816. In some aspects, receiving component 814 preprocesses the inputs before forwarding them, thereby ensuring accurate inference of user intent.

Processing component 816 analyzes the inputs received by receiving component 814 using a trained classification model to map each input to a predicted hidden state defined by a combination of a taxonomy node and an intent category. As a result, processing component 816 connects observable user actions with underlying hidden states, which supports the operation of the HHMM.

Determining component 818 calculates the most probable next hidden state based on the current hidden state and transition probabilities defined in the HHMM. In some aspects, determining component 818 employs algorithms such as Viterbi or forward-backward to identify optimal state paths, thereby guiding subsequent recommendation generation.

Generating component 820 creates recommendations based on the most probable next hidden state identified by determining component 818; these recommendations may include suggested actions, information, or follow-up questions tailored to the user's context and intent. Additionally, generating component 820 ensures that recommendations are both relevant and actionable.

Providing component 822 provides the generated recommendations to the user via input/output device(s) 804 or display device(s) 806, presenting them in user-friendly formats, such as natural language text or graphical elements, to enhance the overall user experience.

Constructing component 824 is responsible for constructing and maintaining the hierarchical taxonomy that represents enterprise knowledge, organizing information into domains, sub-domains, and categories. As another benefit, constructing component 824 ensures that the taxonomy remains comprehensive and up-to-date, which ensures accurate modeling of user interactions in the HHMM.

Categorizing component 826 assigns user intents to predefined categories—such as information seeking, action performing, or small talk, using machine learning models or rule-based systems. Accordingly, categorizing component 826 defines the hidden state space of the HHMM, tailoring recommendations to specific user intents.

Defining component 828 establishes the hidden state space for the HHMM by combining taxonomy nodes with intent categories, wherein each hidden state represents a specific combination of domain or sub-domain and intent. As a result, defining component 828 provides adequate granularity within the hidden state space to support accurate inference and recommendation.

Training component 830 is configured to train the HHMM and classification model using labeled or partially labeled data and employing algorithms such as the Baum-Welch expectation-maximization algorithm to estimate transition and emission probabilities. In some aspects, training component 830 optimizes model parameters to enhance prediction and recommendation accuracy.

Counting component 832 calculates the frequency of training observations associated with each hidden state, using this data to estimate emission probabilities—which represent the likelihood of observing a particular user input given a hidden state—and thereby ensuring that the model accurately reflects real-world behavior.

Summing component 834 aggregates probabilities for each hidden state based on training data by summing individual probabilities of associated observations. As a result, summing component 834 refines emission probabilities and improves HHMM accuracy.

Performing component 836 executes advanced algorithms, such as Baum-Welch or Viterbi, to train and infer hidden states within the HHMM, ensuring that model parameters are optimized and that the most probable state paths are accurately identified during inference. As a result, performing component 836 plays a significant role in maintaining the operational efficiency of the recommendation system.

Note that FIG. 8 is just one example of a processing system consistent with aspects described herein, and other processing systems having additional, alternative, or fewer components are possible with this disclosure.

EXAMPLE CLAUSES

Implementation examples are described in the following numbered clauses:

Clause 1: A method, comprising: receiving a user input associated with a user; processing the user input with a trained classification model to generate a predicted hidden state, wherein: the predicted hidden state is associated with a trained hierarchical hidden Markov model, and the predicted hidden state is associated with a node in a taxonomy and an intent category; determining a most probable next hidden state using the trained HHMM and based on the predicted hidden state; generating a recommendation based on the most probable next hidden state; and providing the recommendation to the user.

Clause 2: The method of claim 1, wherein generating the recommendation based on the most probable next hidden state comprises: providing the user input and the most probable next hidden state to a language model in a prompt requesting a suggestion; and receiving the recommendation from the language model.

Clause 3: The method of any of claim 1 or 2, wherein: determining the most probable next hidden state using the trained HHMM and based on the predicted hidden state comprises using a Viterbi algorithm to determine a most likely state path, and the most probable next hidden state is on the most likely state path.

Clause 4: The method of any of claims 1-3, wherein determining the most probable next hidden state using the trained HHMM and based on the predicted hidden state comprises using a Forward-Backward algorithm to determine the most probable next hidden state.

Clause 5: The method of any of claims 1-4, wherein the user input comprises an utterance in a chat-based interaction with the user.

Clause 6: The method of any of claims 1-5, wherein the user input comprises an interaction with a user interface element.

Clause 7: The method of any of claims 1-6, wherein the taxonomy represents enterprise knowledge and comprises a hierarchical plurality of nodes each corresponding to a domain, sub-domain, or a topic category.

Clause 8: The method of any of claims 1-7, wherein the trained classification model is a multilayer perceptron model.

Clause 9: The method of any of claims 1-8, wherein the intent category is one of a set of intent categories consisting of information seeking, action performing, or communicating.

Clause 10: A method, comprising: constructing a hierarchical taxonomy representing enterprise knowledge, the hierarchical taxonomy comprising a plurality of nodes each corresponding to a domain, a sub-domain, or a category; categorizing user intents into a plurality of intent categories; defining a hidden state space for a hierarchical hidden Markov model, wherein each hidden state in the hidden state space is associated with a node in the hierarchical taxonomy and an intent category of the plurality of intent categories; determining transition probabilities for transitions between hidden states in the hidden state space; determining emission probabilities associating user inputs with hidden states in the hidden state space; training a classification model to predict a probability of each hidden state in the hidden state space based on a user input; and training a HHMM based on a set of training user inputs each labeled with a hidden state.

Clause 11: The method of claim 10, wherein training the classification model to predict the probability of each hidden state in the hidden state space based on the user input comprises for each hidden state in the hidden state space, estimating a probability of the user input.

Clause 12: The method of any of claim 10 or 11, wherein determining emission probabilities associating user inputs with hidden states in the hidden state space comprises, for each respective hidden state in the hidden state space, counting a number of training observations in a training data set for which a training observation is associated with the respective hidden state.

Clause 13: The method of any of claims 10-12, wherein determining emission probabilities associating user inputs with hidden states in the hidden state space comprises, for each respective hidden state in the hidden state space: determining a probability of the respective hidden state for each training user input in the set of training user inputs; summing probabilities for the respective hidden state for all training user inputs in the set of user inputs; and determining an emission probability for the respective hidden state based on the summed probabilities and a number of training user inputs.

Clause 14: The method of any of claims 10-13, wherein training the HHMM comprises performing an expectation maximization algorithm.

Clause 15: The method of any of claims 10-14, wherein the expectation maximization algorithm is a Baum-Welch algorithm.

Clause 16: An apparatus, comprising a processing system that includes one or more processors and one or more memories coupled with the one or more processors, the processing system configured to: perform a method in accordance with any one of Clauses 1-15.

Clause 17: A processing system, comprising means for performing a method in accordance with any one of Clauses 1-15.

Clause 18: A non-transitory computer-readable medium storing program code for causing a processing system to perform the steps of any one of Clauses 1-15.

Clause 19: A computer program product embodied on a computer-readable storage medium comprising code for performing a method in accordance with any one of Clauses 1-15.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

receiving a user input associated with a user;

processing the user input with a trained classification model to generate a predicted hidden state, wherein:

the predicted hidden state is associated with a trained hierarchical hidden Markov model, and the predicted hidden state is associated with a node in a taxonomy and an intent category;

determining a most probable next hidden state using the trained hierarchical hidden Markov model and based on the predicted hidden state;

generating a recommendation based on the most probable next hidden state; and providing the recommendation to the user, wherein generating the recommendation based on the most probable next hidden state comprises:

providing the user input and the most probable next hidden state to a language model in a prompt requesting a suggestion; and receiving the recommendation from the language model.

2. The method of claim 1, wherein:

determining the most probable next hidden state using the trained hierarchical hidden Markov model and based on the predicted hidden state comprises using a Viterbi algorithm to determine a most likely state path, and the most probable next hidden state is on the most likely state path.

3. The method of claim 1, wherein determining the most probable next hidden state using the trained hierarchical hidden Markov model and based on the predicted hidden state comprises using a Forward-Backward algorithm to determine the most probable next hidden state.

4. The method of claim 1, wherein the user input comprises an utterance in a chat-based interaction with the user.

5. The method of claim 1, wherein the user input comprises an interaction with a user interface element.

6. The method of claim 1, wherein the taxonomy comprises a hierarchical plurality of nodes each corresponding to a domain, a sub-domain, or a topic category of enterprise knowledge.

7. The method of claim 1, wherein the trained classification model is a multilayer perceptron model.

8. The method of claim 1, wherein the intent category is one of a set of intent categories consisting of information seeking, action performing, or communicating.

9. The method of claim 1, further comprising:

comparing the user input with one or more hidden state examples; and generating the predicted hidden state based on:

processing the user input with the trained classification model, and comparing the user input with the one or more hidden state examples.

10. A computing system comprising one or more processors and one or more memories storing computer-executable instructions that are executable by the one or more processors to cause the computing system to:

receive a user input associated with a user;

process the user input with a trained classification model to generate a predicted hidden state, wherein:

the predicted hidden state is associated with a trained hierarchical hidden Markov model, and the predicted hidden state is associated with a node in a taxonomy and an intent category;

determine a most probable next hidden state using the trained hierarchical hidden Markov model and based on the predicted hidden state;

generate a recommendation based on the most probable next hidden state; and provide the recommendation to the user, wherein to cause the computing system to generate the recommendation based on the most probable next hidden state, the computer-executable instructions are executable by the one or more processors to cause the computing system to:

provide the user input and the most probable next hidden state to a language model in a prompt requesting a suggestion; and receive the recommendation from the language model.

11. The computing system of claim 10, wherein the computer-executable instructions are further executable by the one or more processors to cause the computing system to:

determine the most probable next hidden state using the trained hierarchical hidden Markov model and based on the predicted hidden state by using a Viterbi algorithm to determine a most likely state path, and the most probable next hidden state is on the most likely state path.

12. The computing system of claim 10, wherein the computer-executable instructions are further executable by the one or more processors to cause the computing system to determine the most probable next hidden state using the trained hierarchical hidden Markov model and based on the predicted hidden state by using a Forward-Backward algorithm to determine the most probable next hidden state.

13. The computing system of claim 10, wherein the user input comprises an utterance in a chat-based interaction with the user.

14. The computing system of claim 10, wherein the user input comprises an interaction with a user interface element.

15. The computing system of claim 10, wherein the taxonomy comprises a hierarchical plurality of nodes, each corresponding to a domain, a sub-domain, or a topic category of enterprise knowledge.

16. The computing system of claim 10, wherein the trained classification model is a multilayer perceptron model.

17. The computing system of claim 10, wherein the intent category is one of a set of intent categories consisting of information seeking, action performing, or communicating.

18. The computing system of claim 10, wherein the computer-executable instructions are further executable by the one or more processors to cause the computing system to:

compare the user input with one or more hidden state examples; and generate the predicted hidden state based on:

processing the user input with the trained classification model, and the comparison of the user input with the one or more hidden state examples.

* * * * *